US012654347B2

(12) United States Patent
Skrobis et al.

(10) Patent No.: US 12,654,347 B2
(45) Date of Patent: Jun. 16, 2026

(54) COATINGS FOR A RAZOR BLADE

(71) Applicant: The Gillette Company LLC, Boston, MA (US)

(72) Inventors: Kenneth James Skrobis, Maynard, MA (US); William Owen Jolley, Spencer, MA (US); John Lawrence Maziarz, Framingham, MA (US); Bin Shen, Shanghai (CN); Ronald Richard Duff, Jr., Shrewsbury, MA (US); Joe David Lussier, Milton, MA (US); Oliver Heinz Claus, Walpole, MA (US); Joseph Allan DePuydt, Salem, NH (US)

(73) Assignee: The Gillette Company LLC, Boston, MA (US)

( * ) Notice: Subject to any disclaimer, the term of this patent is extended or adjusted under 35 U.S.C. 154(b) by 0 days.

(21) Appl. No.: 18/408,229

(22) Filed: Jan. 9, 2024

(65) Prior Publication Data

US 2024/0139982 A1 May 2, 2024

Related U.S. Application Data

(62) Division of application No. 17/231,627, filed on Apr. 15, 2021, now abandoned.

(60) Provisional application No. 63/010,951, filed on Apr. 16, 2020.

(51) Int. Cl.
*B26B 21/60* (2006.01)

(52) U.S. Cl.
CPC .................................. *B26B 21/60* (2013.01)

(58) Field of Classification Search
CPC ..................................................... B62B 21/60
USPC ..................................................... 30/346.54
See application file for complete search history.

(56) References Cited

U.S. PATENT DOCUMENTS

| | | | |
|---|---|---|---|
| 1,135,008 | A | 4/1915 | Fuller |
| 2,065,654 | A | 12/1936 | James |
| 2,244,053 | A | 6/1941 | Comstock |
| 2,697,951 | A | 12/1954 | Paul |

(Continued)

FOREIGN PATENT DOCUMENTS

| | | | |
|---|---|---|---|
| AT | 7252 | B | 12/2004 |
| AU | 2009201673 | A1 | 11/2010 |

(Continued)

OTHER PUBLICATIONS

All Office Actions; U.S. Appl. No. 18/610,031, filed Mar. 19, 2024.

(Continued)

*Primary Examiner* — Nhat Chieu Q Do
(74) *Attorney, Agent, or Firm* — Andrés E. Velarde

(57) ABSTRACT

A razor blade including: a substrate having a tip portion including a tip region, a blade body including a base, and first and second outer sides disposed opposite a split line of the substrate, in which the first and second outer sides converge at a tip, the first outer side comprises a first coating disposed substantially thereon and extending from the tip region toward the base, and a first portion of the second outer side is substantially free of any coating, the first portion extending from the tip region toward the base or being spaced apart from the tip region and the base. Also provided is a method of coating the razor blade.

12 Claims, 20 Drawing Sheets

(56) References Cited

U.S. PATENT DOCUMENTS

| | | | | |
|---|---|---|---|---|
| 2,703,451 | A | 3/1955 | Struve et al. | |
| 3,514,856 | A | 6/1970 | Camp et al. | |
| 3,606,682 | A | 9/1971 | Camp et al. | |
| 3,761,374 | A | 9/1973 | Bromer et al. | |
| 3,842,499 | A | 10/1974 | Dorion et al. | |
| 3,861,040 | A | 1/1975 | Dorion, Jr. | |
| 3,863,340 | A | 2/1975 | Perry | |
| 5,121,660 | A | 6/1992 | Kramer | |
| 5,141,694 | A | 8/1992 | Butlin | |
| 5,232,568 | A | 8/1993 | Parent et al. | |
| 5,295,305 | A | 3/1994 | Hahn et al. | |
| 5,431,071 | A * | 7/1995 | Williams | C21D 9/18 30/350 |
| 5,492,038 | A | 2/1996 | Chylinski | |
| 5,630,275 | A | 5/1997 | Wexler | |
| 6,212,777 | B1 | 4/2001 | Gilder et al. | |
| 6,327,784 | B1 | 12/2001 | Altena et al. | |
| 6,599,178 | B1 | 7/2003 | Gluche et al. | |
| 6,962,000 | B2 | 11/2005 | Brada | |
| 7,060,367 | B2 | 6/2006 | Yamada et al. | |
| 9,969,094 | B2 | 5/2018 | Hejmowski et al. | |
| 10,549,438 | B2 | 2/2020 | Skrobis et al. | |
| 11,148,309 | B2 | 10/2021 | Sonnenberg et al. | |
| 11,759,965 | B2 | 9/2023 | Skrobis et al. | |
| 11,794,366 | B2 | 10/2023 | Skrobis | |
| 2004/0226176 | A1 | 11/2004 | Peterlin | |
| 2005/0028389 | A1 | 2/2005 | Wort et al. | |
| 2007/0283578 | A1 | 12/2007 | Newman | |
| 2008/0086888 | A1 * | 4/2008 | Scheinfeld | B26B 21/60 30/41 |
| 2009/0007442 | A1 | 1/2009 | Kurihara | |
| 2010/0011590 | A1 | 1/2010 | Depuydt et al. | |
| 2011/0010950 | A1 * | 1/2011 | Madeira | C23C 16/45525 216/37 |
| 2012/0317822 | A1 | 12/2012 | Ochiai et al. | |
| 2013/0014395 | A1 | 1/2013 | Patel et al. | |
| 2013/0031794 | A1 * | 2/2013 | Duff, Jr. | B26B 21/60 204/192.15 |
| 2014/0360021 | A1 | 12/2014 | Sonnenberg et al. | |
| 2015/0328789 | A1 | 11/2015 | Skrobis et al. | |
| 2016/0001456 | A1 | 1/2016 | Duff, Jr. et al. | |
| 2016/0096282 | A1 | 4/2016 | Doyle et al. | |
| 2017/0136640 | A1 | 5/2017 | Skrobis et al. | |
| 2017/0136641 | A1 | 5/2017 | Siozios et al. | |
| 2017/0341250 | A1 | 11/2017 | Skrobis et al. | |
| 2018/0001497 | A1 * | 1/2018 | Fontecchio | B26B 21/60 |
| 2018/0043561 | A1 | 2/2018 | Nisby et al. | |
| 2018/0162000 | A1 | 6/2018 | Duff, Jr. et al. | |
| 2018/0264669 | A1 | 9/2018 | Howell | |
| 2020/0262093 | A1 | 8/2020 | Fontecchio et al. | |
| 2020/0307006 | A1 | 10/2020 | Kontokostas et al. | |
| 2020/0316802 | A1 | 10/2020 | Kontokostas et al. | |
| 2021/0094199 | A1 | 4/2021 | Lee et al. | |
| 2021/0221014 | A1 | 7/2021 | Mavroeidis et al. | |
| 2021/0276211 | A1 | 9/2021 | Harris | |
| 2021/0323180 | A1 | 10/2021 | Shen et al. | |
| 2021/0323181 | A1 | 10/2021 | Shen et al. | |
| 2021/0323184 | A1 | 10/2021 | Skrobis et al. | |
| 2023/0032402 | A1 | 2/2023 | Gluche et al. | |
| 2023/0037149 | A1 | 2/2023 | Gluche et al. | |
| 2023/0051077 | A1 | 2/2023 | Gluche et al. | |
| 2023/0066180 | A1 | 3/2023 | Gluche et al. | |
| 2023/0405856 | A1 | 12/2023 | Park | |
| 2023/0405857 | A1 | 12/2023 | Park | |

FOREIGN PATENT DOCUMENTS

| | | | |
|---|---|---|---|
| CH | 444710 | A | 9/1967 |
| CN | 2298107 | Y | 11/1998 |
| CN | 205438649 | U | 8/2016 |
| CN | 109122374 | A | 1/2019 |
| CN | 209630428 | U | 11/2019 |
| CN | 109794968 | B | 4/2024 |
| EP | 0582676 | A1 | 2/1994 |
| EP | 0628379 | A1 | 12/1994 |
| EP | 0884142 | A1 | 12/1998 |
| EP | 1397234 | A1 | 3/2004 |
| EP | 1985726 | A1 | 10/2008 |
| EP | 3683332 | A1 | 7/2020 |
| EP | 3828311 | A1 | 6/2021 |
| JP | S6148391 | A | 3/1986 |
| JP | H08323507 | A | 12/1996 |
| JP | 2014018206 | A | 2/2014 |
| WO | 0246526 | A1 | 6/2002 |
| WO | 02083374 | A2 | 10/2002 |
| WO | 02100610 | A1 | 12/2002 |
| WO | 03101683 | A1 | 12/2003 |
| WO | 2004091871 | A1 | 10/2004 |
| WO | 2005090024 | A2 | 9/2005 |
| WO | 2006045460 | A1 | 5/2006 |
| WO | 2008065949 | A1 | 6/2008 |
| WO | 2010138371 | A1 | 12/2010 |
| WO | 2013010072 | A1 | 1/2013 |
| WO | 2016057473 | A1 | 4/2016 |
| WO | 2016079148 | A1 | 5/2016 |
| WO | 2016153798 | A1 | 9/2016 |
| WO | 2018141605 | A1 | 8/2018 |

OTHER PUBLICATIONS

Unpublished U.S. Appl. No. 18/610,031, filed Mar. 19, 2024, to Bin Shen et al.

15702 PCT Search Report and Written Opinion for PCT /US2021/027449 dated Sep. 9, 2021, 12 pages.

All Office Actions, U.S. Appl. No. 17/231,561, filed Apr. 15, 2021.

All Office Actions, U.S. Appl. No. 17/231,593, filed Apr. 15, 2021.

All Office Actions, U.S. Appl. No. 17/231,605, filed Apr. 15, 2021.

All Office Actions, U.S. Appl. No. 17/231,627, filed Apr. 15, 2021.

All Office Actions, U.S. Appl. No. 17/231,579, filed Apr. 15, 2021.

All Office Actions: U.S. Appl. No. 19/198,608, filed May 5, 2025; See Patent Center.

Unpublished U.S. Appl. No. 19/198,608, filed May 5, 2025, to Bin Shen et al., See Patent Center.

All Office Actions; U.S. Appl. No. 19/352,622, filed on Oct. 8, 2025; See Patent Center.

U.S. Unpublished U.S. Appl. No. 19/352,622, filed on Oct. 8, 2025, to Bin Shen et al.; See Patent Center.

* cited by examiner

COATINGS FOR A RAZOR BLADE

FIELD OF THE INVENTION

The invention generally relates to coating of substrates, and more particularly to improved coatings on razor components, such as razor blades.

BACKGROUND OF THE INVENTION

A razor blade is typically formed of a suitable substrate material, such as stainless steel, with a cutting edge formed with a wedge-shaped configuration with an ultimate tip having a radius less than about 1000 angstroms (Å), e.g., about 200-300 Å. One or more hard coatings, such as diamond, amorphous diamond, diamond-like carbon (DLC) material, nitrides, carbides, oxides, or ceramics, may be applied to the substrate material, particularly the cutting edge, to improve strength, corrosion resistance, and shaving ability and to maintain needed strength while permitting thinner edges with lower cutting forces to be used. One or more soft coatings generally of polymeric material, such as polytetrafluoroethylene (PTFE), may be layered on top of the hard coating(s) to impart lubricity and reduce friction. Interlayers of niobium or chromium-containing materials can aid in improving the binding between the substrate, typically stainless steel, and hard carbon coatings, such as DLC. The coatings may be applied using any suitable method, such as Physical Vapor Deposition (PVD) techniques for the hard coating(s) and dipping, spraying, and/or brushing for the soft coating(s). Examples of razor blades and processes of manufacture are described in U.S. Pat. Nos. 5,295,305; 5,232,568; 4,933,058; 5,032,243; 5,497,550; 5,940,975; and 5,669,144; EP 0591339; and PCT 92/03330, which are hereby incorporated by reference.

Conventional blades typically include a generally equal amount of material(s) on both sides of the substrate, often applied by vapor deposition parallel to the cutting edge. The coatings on these blades are highly symmetrical and include a substantially similar composition, coverage area, microstructure, etc. on both sides of the cutting edge. While current razor blades perform adequately, in order for next generation products to perform better, improvements to interactions between the blade and skin and the blade and hair can be made.

SUMMARY OF THE INVENTION

In accordance with an aspect of the present disclosure, a razor blade is provided, which includes: a substrate having a tip portion comprising a tip region, a blade body including a base, and first and second outer sides disposed opposite a split line of the substrate, wherein the first and second outer sides converge at a tip. The first outer side includes a first coating disposed substantially thereon, the first coating extending from the tip region toward the base, and a first portion of the second outer side is substantially free of any coating, in which the first portion extends from the tip region toward the base or is spaced apart from the tip region and the base.

In accordance with another aspect of the present disclosure, a method of coating a razor blade is provided, in which the razor blade includes a substrate having a tip portion including a tip region, a blade body including a base, and first and second outer sides disposed opposite a split line of the substrate, wherein the first and second outer sides converge at a tip, the method including one of: (i) applying a first coating only to a portion of the first outer side, the coating extending from the tip region toward the base and being disposed substantially on the first outer side; or (ii) applying a first coating to a portion of the first outer side, the first coating extending from the tip region toward the base and being disposed substantially on the first outer side, and applying a second coating to the second outer side such that a first portion of the second outer side is substantially free of any coating and a second portion of the second outer side comprises the second coating, wherein the first portion extends from the tip region toward the base or is spaced apart from the tip region and the base.

BRIEF DESCRIPTION OF THE DRAWINGS

While the specification concludes with claims particularly pointing out and distinctly claiming the subject matter which is regarded as forming the present invention, it is believed that the invention will be better understood from the following description which is taken in conjunction with the accompanying drawings in which like designations are used to designate substantially identical elements, and in which:

DETAILED DESCRIPTION OF THE INVENTION

The term "asymmetric blade," as used herein, means a blade defined by a substrate having a first portion comprising a blade body and a second portion comprising a tip portion wherein a split line passes through a tip of the tip portion, extends through the first and second portions and separates the second portion into generally asymmetric first and second sections. The outer surface of the first section of the second portion is asymmetric with regards to the outer surface of the second section. The outer surface of the first section of the second portion may function as a skin-contacting surface, and the outer surface of the second section may function as a hair-cutting surface.

A "split line," as used herein, means a line extending through the tip of the tip portion of the blade substrate, separates the second portion into asymmetrical first and second sections and is generally parallel with first and second generally parallel outer surfaces of the first portion defining the blade body of the blade substrate.

Figure 1:
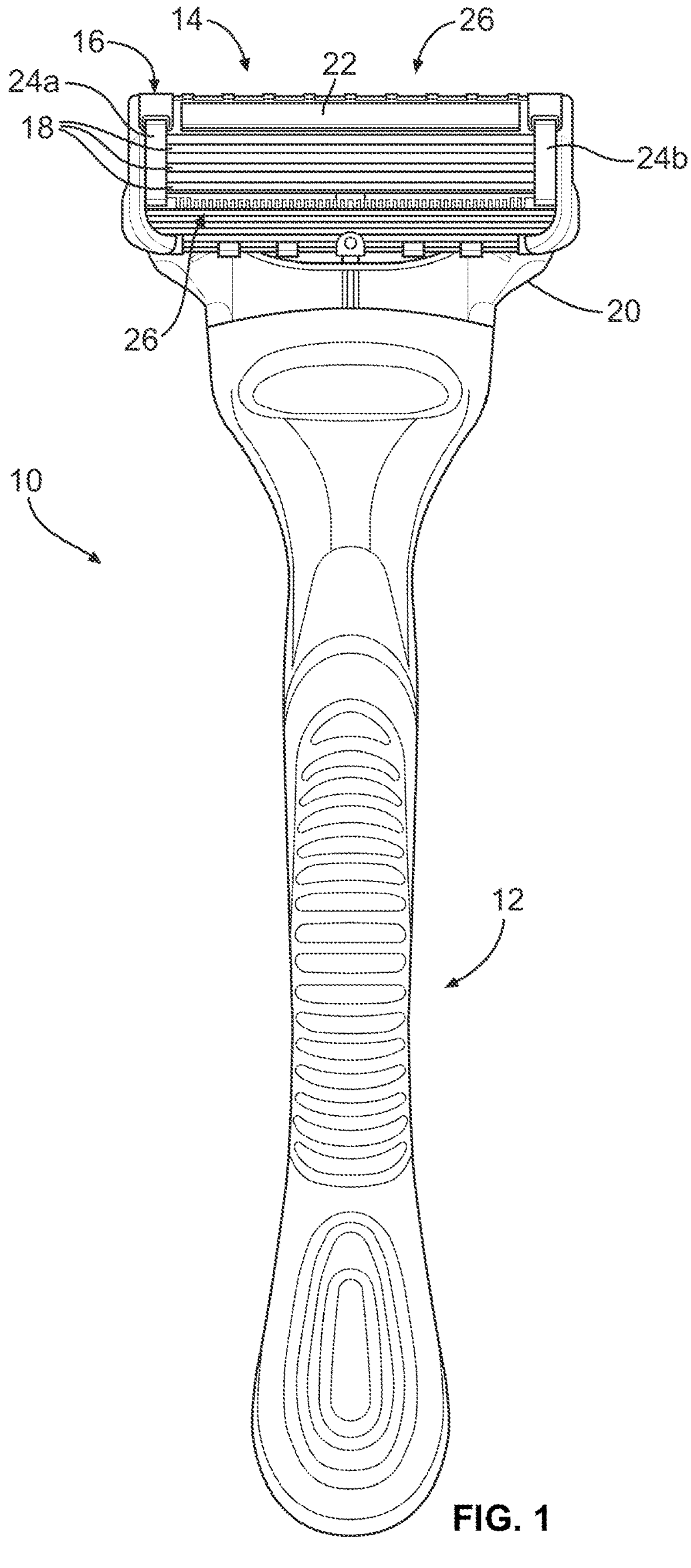
FIG. 1 is a front view of a razor system comprising a handle and a razor cartridge in accordance with the present disclosure.

With reference to FIG. 1, a shaving razor system 10 comprises a handle 12 and a razor cartridge 14. In some examples, the razor cartridge 14 may be detachably mounted to the handle 12 with a connector 20, as shown, and in other examples, the razor cartridge 14 may be attached permanently to the handle 12. The razor cartridge 14 may pivot relative to the handle 12. The razor cartridge 14 may include a cartridge housing 16 having one or more razor blades 18. Although three blades are shown in FIG. 1, it is understood that any number of blades, more or less, may be mounted within the razor cartridge 14. The razor blades 18 may be mounted within the cartridge housing 16 and secured with clips 24*a* and 24*b* as shown. The cartridge housing 16 may further comprise a cap 22 located near a back of the cartridge housing 16 and one or more guard structures 26 located near a front of the cartridge housing 16. The cap 22 may comprise one or more lubrication members (not labeled).

Figure 2:
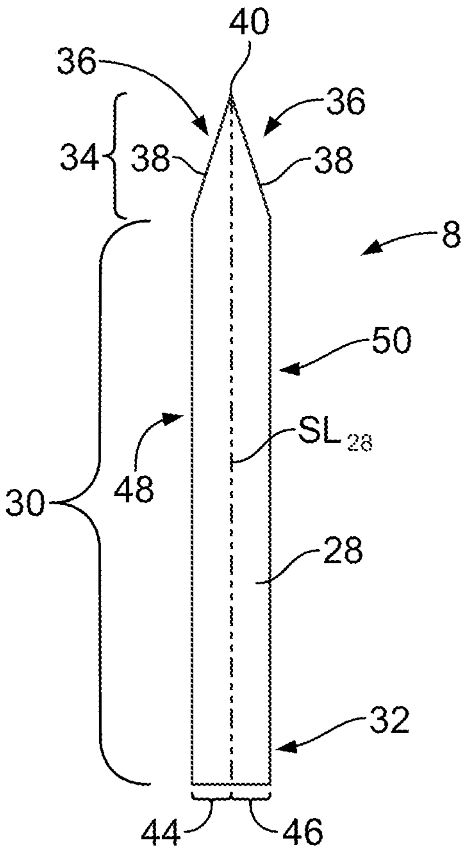
FIG. 2 is a side view of a razor blade with a symmetrical substrate in accordance with the present disclosure.
Figure 3:
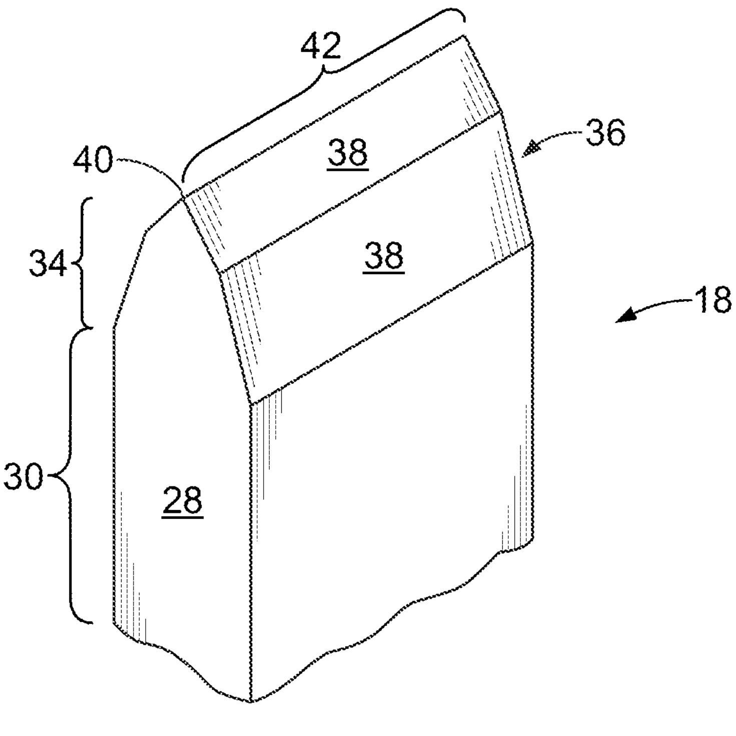
FIG. 3 is a perspective view of a tip portion of another razor blade with a symmetrical substrate in accordance with the present disclosure.
Figure 4:
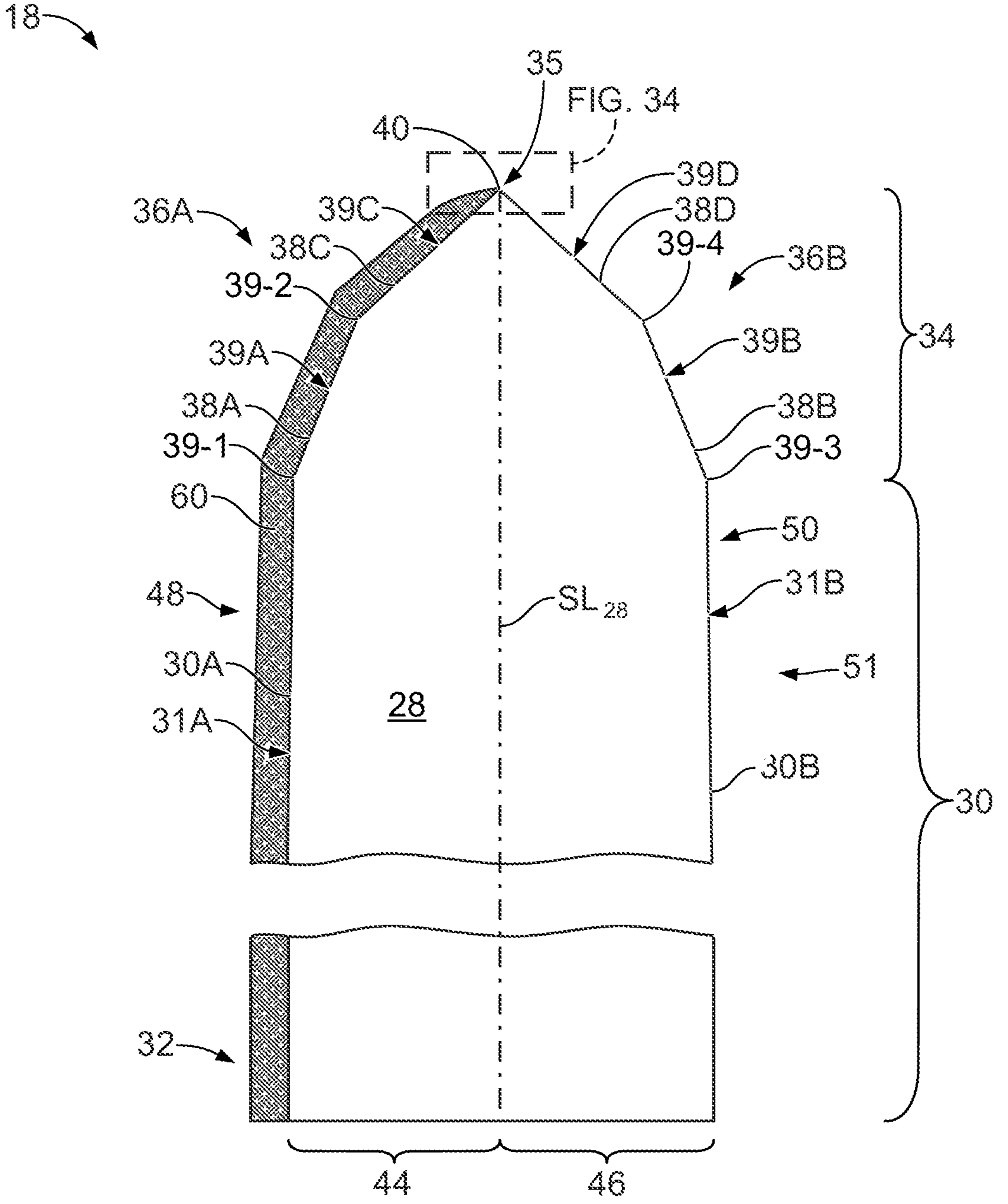
FIGS. 4, 5, 6, 7, 8, 9, 10, 11, 12, 13, 14, 15, 16, and 17 are side views of the tip portion of the razor blade of FIG. 3 comprising one or more coatings in accordance with the present disclosure.

FIG. 2 is a side view of a razor blade 8 in accordance with the present disclosure, and FIGS. 3 and 4 are detailed perspective and side views, respectively, of elements of a razor blade 18 in accordance with the present disclosure. The razor blades 8 and 18 shown in FIGS. 2-4 may each comprise a substrate 28 comprising a first portion with a blade body 30 and a second portion with a tip portion 34. As used herein, a "substrate" signifies the substance or material acted upon by the deposition process(es) in the present disclosure. Illustrative embodiments herein relate to a stainless steel substrate commonly used for razor blade formation. It is contemplated that the substrate of the present invention may also be comprised of other metals, plastic, ceramic, or any other material. The blade body 30 may comprise a base 32, and the tip portion 34 may comprise flanks 36 that converge at a tip 40 to define a cutting edge 42 of the substrate 28, which performs the cutting of hair. The flanks 36 may each comprise one or more bevels or facets 38, as described herein.

In the example illustrated in FIGS. 2-4, the substrate 28 is substantially symmetrical and may comprise a split line SL 28 that passes through the tip 40 and divides or separates the substrate 28 into substantially equal first and second sections or halves 44 and 46. One outer side 48 (also referred to herein as a first outer side) of the substrate 28 is disposed opposite the split line $SL_{28}$ with respect to the other outer side 50 (also referred to herein as the second outer side). As used herein, the terms "first" and "second" are for reference only and are not intended to be limiting.

At least a portion of one outer side of the substrate 28, e.g., the first outer side 48, may define a skin-contacting surface, and at least a portion of the other outer side, e.g., the second outer side 50, may define a hair-cutting surface. It was determined that the two sides of the razor blade generally perform different functions (e.g., a bottom side that contacts the skin and a top side that performs cutting of the hair, in which both sides perform cutting of the hair with the top side (e.g., away from the skin) having a larger influence). Studies have shown that placing Teflon on one bevel and no Teflon on the other display completely different cutting forces depending on whether the Teflon coated bevel is placed skin side up (e.g., away from the skin) versus skin side down (e.g., closer to the skin). When razor blades with no Teflon coating on one side are placed such that that side (e.g., no Teflon coating) is skin side down, only small cutting force increases were noted when compared to blades having Teflon on both sides, but when razor blades with no Teflon coating are placed skin side up very significant cutting force increases were measured when compared to blades having Teflon on both sides.

With reference to FIG. 4, the tip portion 34 may comprise a first flank 36A defined by a portion of the first outer side 48 and a second flank 36B defined by a portion of the second outer side 50, in which the first and second flanks 36A and 36B converge at the tip 40. The first flank 36A may comprise one or more first facets, e.g., first and third facets 38A and 38C, and the second flank 36B may comprise one or more second facets, e.g., second and fourth facets 38B and 38D. The first facet 38A meets the blade body 30 at a first junction 39-1 and extends between the blade body 30 and the third facet 38C on the first outer side 48 of the substrate 28. The third facet 38C meets the first facet 38A at a second junction 39-2 and extends between the first facet 38A and the tip 40 on the first outer side 48. On the second outer side 50 of the substrate 28, the second facet 38B meets the blade body 30 at a third junction 39-3 and extends between the blade body 30 and the fourth facet 38D. The fourth facet 38D meets the second facet 38B at a fourth junction 39-4 and extends between the second facet 38B and the tip 40 on the second outer side 50. The third and fourth facets 38C and 38D, which may also be referred to as end facets, converge at the tip 40 to define the cutting edge 42. In other examples, the flanks 36 may each include one facet 38 (see the razor blade 8 in FIG. 2) or three or more facets (not shown). In the razor blades 8 and 18 shown in FIGS. 2-4, an outer shape or geometry of the first outer side 48 may be substantially the same as an outer shape or geometry of the second outer side 50. For example, the first facet 38A may substantially correspond to the second facet 38B and may comprise a substantially similar length, as defined between the first and second junctions 39-1 and 39-2 and between the third and fourth junctions 39-3 and 39-4, respectively. The third facet 38C may similarly substantially correspond to the fourth facet 38D and may comprise a substantially similar length, as defined between the tip 40 and the second junction 39-2 and the tip 40 and the fourth junction 39-4, respectively. It follows that the angles at the junctions 39-1 and 39-3, and the angles at the junctions 39-2 and 39-4 may also generally be substantially similar.

With continued reference to FIG. 4, the razor blade 18 may comprise a plurality of outer surfaces, including first and second blade body outer surfaces 31A and 31B defined by outer surfaces of the first and second portions 30A and 30B, respectively, of the blade body 30; and first, second, third, and fourth facet outer surfaces 39A, 39B, 39C, and 39D defined by outer surfaces of the first, second, third, and fourth facets 38A, 38B, 38C, and 38D, respectively. The first outer side 48 of the substrate 28 includes the first blade body outer surface 31A and the first and third facet outer surfaces 39A and 39C. The second outer side 50 includes the second blade body outer surface 31B and the second and fourth facet outer surfaces 39B and 39D. The first and second blade body outer surfaces 31A and 31B may be generally parallel to each other, and the split line $SL_{28}$ may be generally parallel with the first and second blade body outer surfaces 31A and 31B. The first and second outer sides 48 and 50 converge at the tip 40 to define the cutting edge 42 of the substrate 28.

Figure 18:
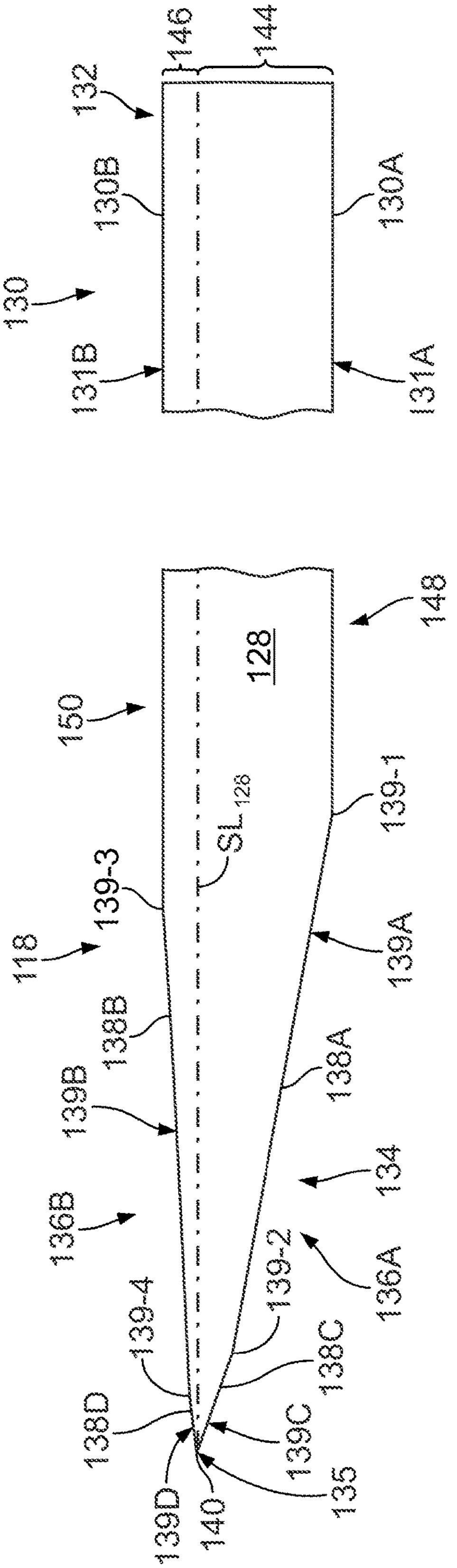
FIG. 18 is a side view of a razor blade with an asymmetrical substrate in accordance with the present disclosure.
Figure 19:
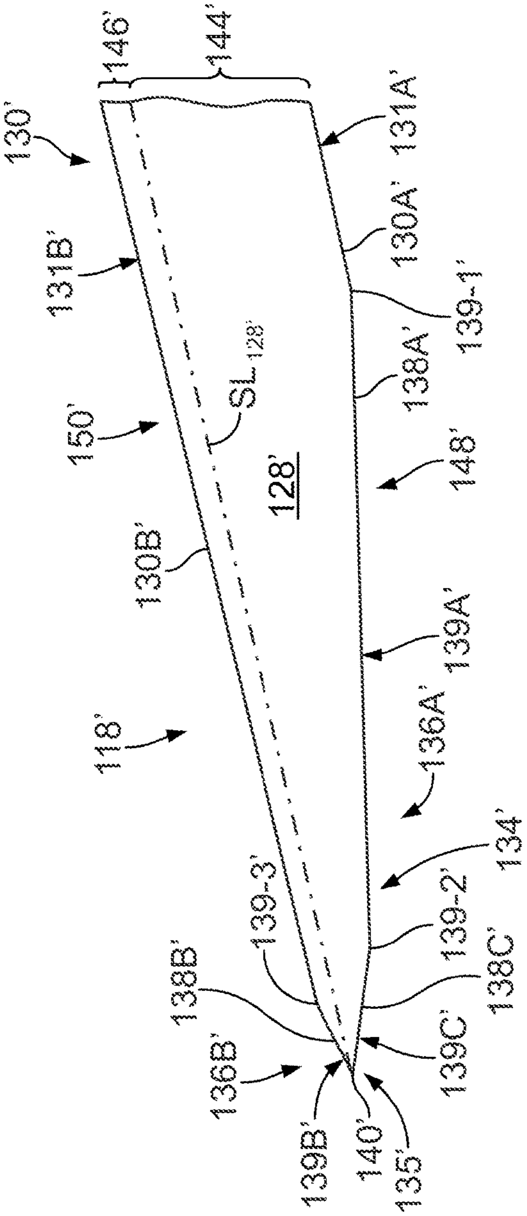
FIG. 19 is a side view of another razor blade with an asymmetrical substrate in accordance with the present disclosure.

FIGS. 18 and 19 are side views illustrating exemplary embodiments of razor blades 118 and 118' in accordance with the present disclosure. Each razor blade 118, 118' may comprise a substrate 128, 128' comprising a first portion comprising a blade body 130, 130' and a second portion comprising a tip portion 134, 134'. The blade body 130, 130' may comprise a base 132 (not shown in FIG. 19), and the tip portion 134, 134' may comprise flanks 136A, 136B and 136A', 136B' that converge at a respective tip 140, 140' to define a cutting edge (not labeled) of the respective substrate 128, 128'. The flanks 136, 136' may each comprise one or more respective bevels or facets, as described herein. The substrates 128, 128' may be asymmetrical, with a split line $SL_{128}$, $SL_{128'}$ that passes through the tip 140, 140', is parallel to the blade body outer surfaces 131A and 131B, and divides or separates the substrate 128, 128' into asymmetrical first and second sections or halves 144, 144' and 146, 146'. With reference to FIG. 18, a first outer side 148 of the substrate 128 is disposed opposite the split line SL 128 with respect to a second outer side 150. With reference to FIG. 19, a first outer side 148' of the substrate 128' is disposed opposite the split line $SL_{128'}$ with respect to a second outer side 150'. At least a portion of one outer side of each respective substrate 128, 128', e.g., the first outer side 148, 148', may define a skin-contacting surface, and at least a portion of the other outer side, e.g., the second outer side 150, 150', may define a hair-cutting surface.

In the example shown in FIG. 18, the tip portion 134 of the substrate 128 may comprise a first flank 136A defined by a portion of the first outer side 148 and a second flank 136B defined by a portion of the second outer side 150. The first flank 136A may comprise one or more first facets, e.g., first and third facets 138A and 138C, and the second flank 136B may comprise one or more second facets, e.g., second and fourth facets 138B and 138D. On the first outer side 148 of the substrate 128, the first facet 138A meets the blade body 130 at a first junction 139-1 and extends between the blade body 130 and the third facet 138C; and the third facet 138C meets the first facet 138A at a second junction 139-2 and extends between the first facet 138A and the tip 140. On the second outer side 150 of the substrate 128, the second facet 138B meets the blade body 130 at a third junction 139-3 and extends between the blade body 130 and the fourth facet 138D; and the fourth facet 138D meets the second facet 138B at a fourth junction 139-4 and extends between the second facet 138B and the tip 140. The third and fourth facets 138C and 138D, which may also be referred to as end facets, converge at the tip 140 to define the cutting edge of the substrate 128.

In the example shown in FIG. 19, the tip portion 134' of the substrate 128' may comprise a first flank 136A' defined by a portion of the first outer side 148' and a second flank 136B' defined by a portion of the second outer side 150'. The first flank 136A' may comprise one or more first facets, e.g., first and third facets 138A' and 138C', and the second flank 136B' may comprise one or more second facets, e.g., a second facet 138B'. On the first outer side 148' of the substrate 128', the first facet 138A' meets the blade body 130' at a first junction 139-1' and extends between the blade body 130' and the third facet 138C'; and the third facet 138C' meets the first facet 138A' at a second junction 139-2' and extends between the first facet 138A' and the tip 140'. On the second outer side 150' of the substrate 128', the second facet 138B' meets the blade body 130 at a third junction 139-3' and extends between the blade body 130' and the tip 140'. The second and third facets 138B' and 138C', which may also be referred to as end facets, converge at the tip 140' to define the cutting edge of the substrate 128'.

Because the substrates 128, 128' are asymmetrical, an outer shape or geometry of the first outer side 148, 148' is different from an outer shape or geometry of the second outer side 150, 150'. For example, with reference to FIG. 18, the first facet 138A may comprise a different length, as compared to the second facet 138B, with the lengths being defined between the first and second junctions 139-1 and 139-2 and the third and fourth junctions 139-3 and 139-4, respectively. In some examples, the length of the first facet 138A may be greater than the length of the second facet 138B, and in other examples, the length of the first facet 138A may be less than the length of the second facet 138B. The third facet 138C may similarly comprise a different length, as compared to the fourth facet 138D, with the lengths being defined between the tip 140 and the second junction 139-2 and the fourth junction 139-4, respectively. In some examples, the length of the third facet 138C may be greater than the length of the fourth facet 138D, and in other examples, the length of the third facet 138C may be less than the length of the fourth facet 138D.

With reference to FIG. 19, the first outer side 148' comprises two facets 138A' and 138C', and the second outer side 150' comprises only one facet 138B'. The third facet 138C' may similarly comprise a different length, as compared to the second facet 138B', with the lengths being defined between the tip 140' and the second junction 139-2' and the third junction 139-3', respectively. In some examples, the length of the third facet 138C' may be greater than the length of the second facet 138B', and in other examples, the length of the third facet 138C' may be less than the length of the second facet 138B'.

Each of the razor blades 118, 118' may comprise a plurality of outer surfaces. With reference to FIG. 18, the razor blade 118 comprises first and second blade body outer surfaces 131A and 131B defined by outer surfaces of first and second portions 130A and 130B, respectively, of the blade body 130; and first, second, third, and fourth facet outer surfaces 139A, 139B, 139C, and 139D defined by outer surfaces of the first, second, third, and fourth facets 138A, 138B, 138C, and 138D, respectively. The first and second blade body outer surfaces 131A and 131B may be generally parallel to each other, and the split line SL 128 may be generally parallel with the first and second blade body outer surfaces 131A and 131B. The first outer side 148 of the substrate 128 includes the first blade body outer surface 131A and the first and third facet outer surfaces 139A and 139C, and the second outer side 150 includes the second blade body outer surface 131B and the second and fourth facet outer surfaces 139B and 139D. The first and second outer sides 148 and 150 converge at the tip 140 to define the cutting edge of the substrate 128. The second and fourth facets 138B and 138D may be located closer to the split line SL 128 than the first and third facets 138A and 138C, such that the first half 144 of the substrate 128 is larger than the second half 146.

With reference to FIG. 19, the razor blade 118' comprises first and second blade body outer surfaces 131A' and 131B' defined by outer surfaces of the first and second portions 130A' and 130B', respectively, of the blade body 130'; and first, second, and third facet outer surfaces 139A', 139B', and 139C' defined by outer surfaces of the first, second, and third facets 138A', 138B', and 138C', respectively. The first and second blade body outer surfaces 131A' and 131B' may be generally parallel to each other, and the split line $SL_{128'}$ may be generally parallel with the first and second blade body outer surfaces 131A' and 131B'. The first outer side 148' of the substrate 128' includes the first blade body outer surface 131A' and the first and third facet outer surfaces 139A' and 139C', and the second outer side 150' includes the second blade body outer surface 131B' and the second facet outer surface 139B'. The first and second outer sides 148' and 150' converge at the tip 140' to define the cutting edge of the substrate 128'. The second facet 138B' may be located closer to the split line $SL_{128'}$ than the first and third facets 138A' and 138C', such that the first half 144' of the substrate 128' is larger than the second half 146'.

Razor blades in accordance with the present disclosure may comprise a coating disposed substantially on one or both outer sides of the razor blade, in which at least a portion of one outer side is free of any coating. A "layer" as used herein may signify at least one material on a razor blade satisfied by a variety of factors, including but not limited to, the composition, morphology, or structure of the layer(s); the presence of a boundary between layers; whether the process used to make the product is expected to result in one or more layers; and whether there is a sufficient change in composition or morphology as to result in one or more layers. As one example, there may be only one type of material on the razor blade but with distinguishable layers, each layer having a different morphology. As used herein, a "coating" may signify one or more layers on a razor blade, in which each layer comprises one or more materials. Thus, the present invention "coating" may be defined by a single layer or by multiple layers. The present invention also contemplates the term "coating" to signify the overall or total coating on one side of the razor blade, which includes all of the layers on that one side of the razor blade.

In particular, a "coating" as used herein includes all layer(s) of material(s) applied to one outer side of the razor blade. For example, a coating may include one or more layers as defined herein, such as a first layer that is disposed substantially on a portion or the entirety of one outer side of the razor blade; a second layer that is formed on top of at least a portion of the first layer; a third layer that is formed on top of at least a portion of the second layer; and so on. A coating may further include a plurality of sections that are disposed substantially on one outer side of the razor blade, wherein each section may comprise one or more layers of material(s). For example, the coating may comprise a first section that extends substantially from a first point or location on one outer side of a razor blade to a second point or location on the one outer side; a second section that extends substantially from the second point or location to a third point or location on the one outer side; a third section that extends substantially from the third point or location to a fourth point or location on the one outer side; and so on, in which each section is substantially different from an adjacent section, as described in detail herein.

As used herein to, the phrases "disposed substantially on," "extending substantially from," and similar phrases are used to describe a location or position of each coating, including one or more layers and/or sections thereof, and signifies that a majority of the coating/layer/section is disposed on an indicated outer side and/or surface(s) of the razor blade and/or that a majority of the coating/layer/section extends between two indicated points or locations on the outer side and/or surface(s) of the razor blade. As described herein with respect to FIGS. 34-37, these phrases may encompass structures in which a portion of the coating/layer/section extends over the tip and onto the other outer side or surface; overlaps onto an adjacent outer side or surface; extends slightly beyond the two indicated points or locations on the surface; or extends slightly past, or stops slightly short of, an identified junction between adjacent facets or between the blade body and a facet.

In accordance with the present disclosure, one outer side of a razor blade comprises a coating, and at least a portion of the other outer side of the razor blade is free of any coating. FIGS. 4-17 illustrate exemplary coatings with respect to an asymmetrical razor blade 18 having a symmetrical substrate 28, and FIGS. 20-33 illustrate exemplary coatings with respect to an asymmetrical razor blade 118 having an asymmetrical substrate 128. Some labeling in FIGS. 5-17 and 20-33 is removed to illustrate other aspects of the structure in detail.

As used herein, the terms "symmetrical," "asymmetrical," and derivatives thereof may refer to an outer shape of a substrate that defines a razor blade and/or to coating(s) formed thereon, as determined with respect to a split line of the substrate. For example, the substrate 28 in FIG. 4 is substantially symmetrical (i.e., the split line SL 28 divides the substrate 28 into substantially equal sections/halves 44 and 46 with substantially similar outer shapes that are generally mirror images of each other), but the coating(s) formed on the substrate 28 in accordance with the present disclosure may be asymmetrical, as described herein in detail, such that the razor blade 18 is asymmetrical. The substrate 128 in FIG. 18 and the coatings formed thereon are both asymmetrical, as described herein, such that the razor blade 118 is asymmetrical.

In FIGS. 4-17, one outer side, e.g., the first outer side 48, of the substrate 28 may comprise a coating, and at least a portion 51 of the other outer side, e.g., the second outer side 50, of the substrate 28 may be substantially free of any coating. In some examples, at least a portion of the first outer side 48 may define a skin-contacting surface. The portion 51 may extend from the tip region 35 toward the base 32, as shown in FIGS. 4-16, or may be spaced apart from the tip region 35 and the base 32, as shown in FIG. 17. It is reemphasized that the terms "first" and "second" as used herein are for reference only and are not intended to be limiting. For example, although the lefthand side of the substrate 28 in FIGS. 4-17 is referred to as the "first" outer side, it is understood that the righthand side of the substrate 28 could also be the "first" outer side.

Figure 5:
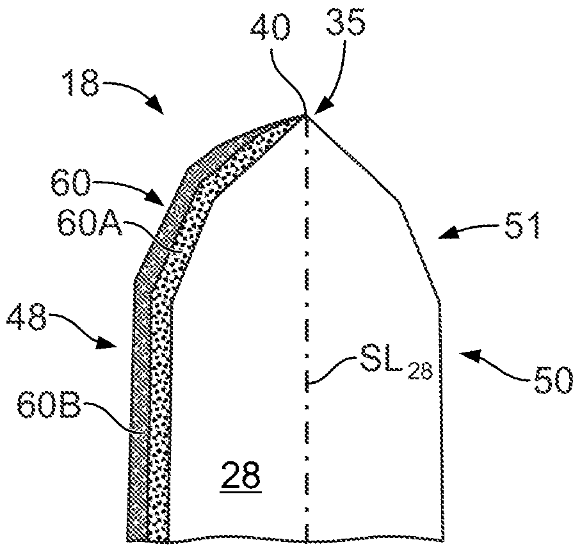
Figure 6:
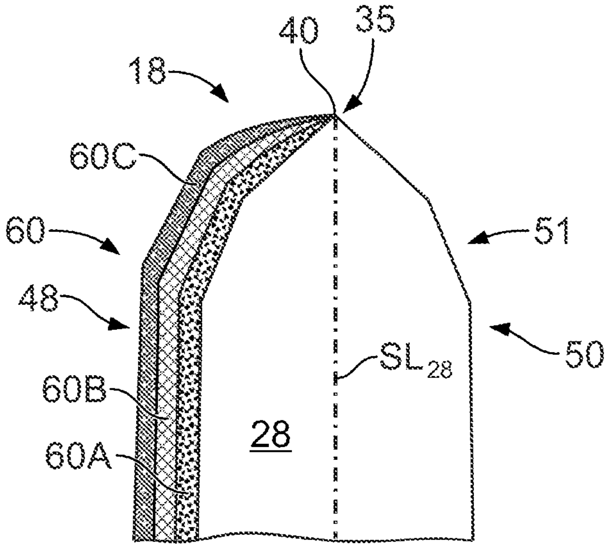
Figure 34:
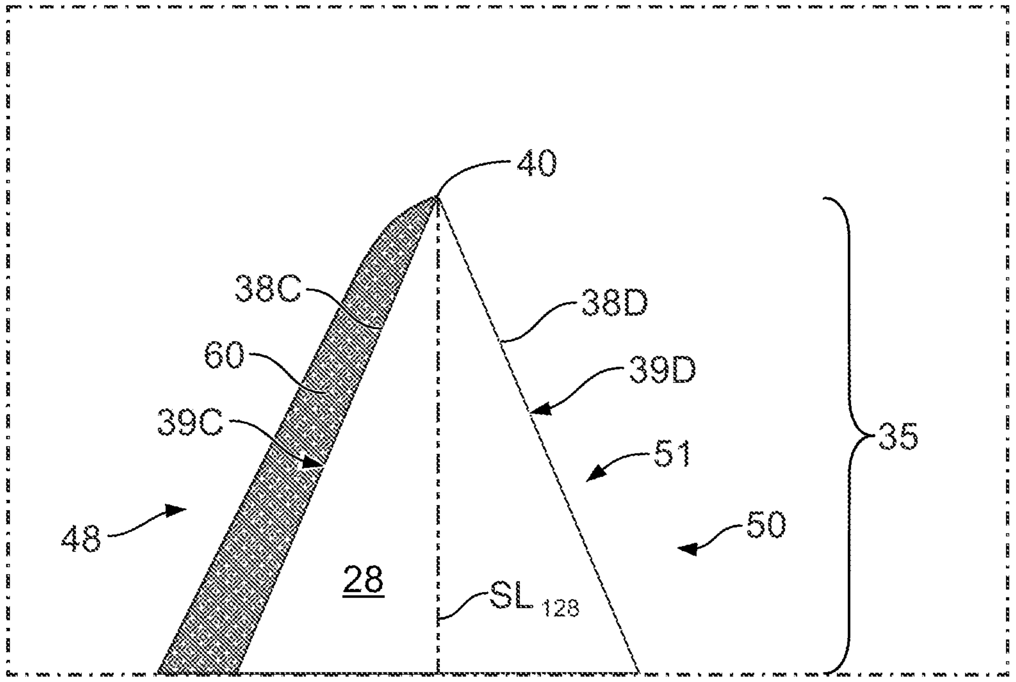
FIG. 34 is a detailed side view of a tip region of the razor blade of FIGS. 4 and 20.

With reference to FIGS. 4-6, the razor blade 18 may comprise a coating 60 disposed substantially on the first outer side 48 of the substrate 28. In some examples, the coating 60 may comprise a single layer of material, as shown in FIG. 4. In other examples, the coating 60 may comprise a plurality of layers of material(s), as shown in FIGS. 5 and 6 and described in detail herein. The coating 60 extends from a tip region 35 toward the base 32 (see FIG. 4) along the first outer side 48 of the substrate 28. As shown in FIG. 4, the tip portion 34 of the substrate 28 comprises the tip region 35, in which the tip region 35 encompasses, i.e., includes, the tip 40 plus a portion of the substrate 28 extending from the tip 40 toward the base 32 by about 1 μM along the first and second outer sides 48 and 50, as shown in FIG. 34.

With reference to FIG. 5, in some examples, the coating 60 may comprise first and second layers 60A and 60B, in which the first layer 60A is disposed substantially on the first outer side 48 and the second layer 60B is formed on top of at least a portion of the first layer 60A. With reference to FIG. 6, in other examples, the first coating 60 may comprise at first, second, and third layers 60A-60C, in which the first layer 60A is disposed substantially on the first outer side 48, the second layer 60B is formed on top of at least a portion of the first layer 60A, and the third layer 60C is formed on top of at least a portion of the second layer 60B. As described herein, the coating 60 and/or any of the layers 60A-60C thereof may be subjected to ion implantation to generate, for example, a layer 60' comprising an ion-implanted material 61 shown in FIG. 13.

In the examples shown in FIGS. 4-6, the coating 60 (including all layers 60A-60C thereof) is depicted as extending along the first outer side 48 of the substrate 28 from the tip region 35 onto the blade body 30, and in some instances, all the way to the base 32 of the razor blade 18 as shown in FIG. 4. In other examples, as shown in FIGS. 7 and 8, the coating and/or one or more layers thereof may stop short of the blade body 30 and/or the base 32, and in some particular examples, the coating and/or one or more layers thereof may be disposed substantially only on the tip portion 34 of the substrate 28, e.g., on one or both of the first and third facets 38A and 38C.

Figure 7:
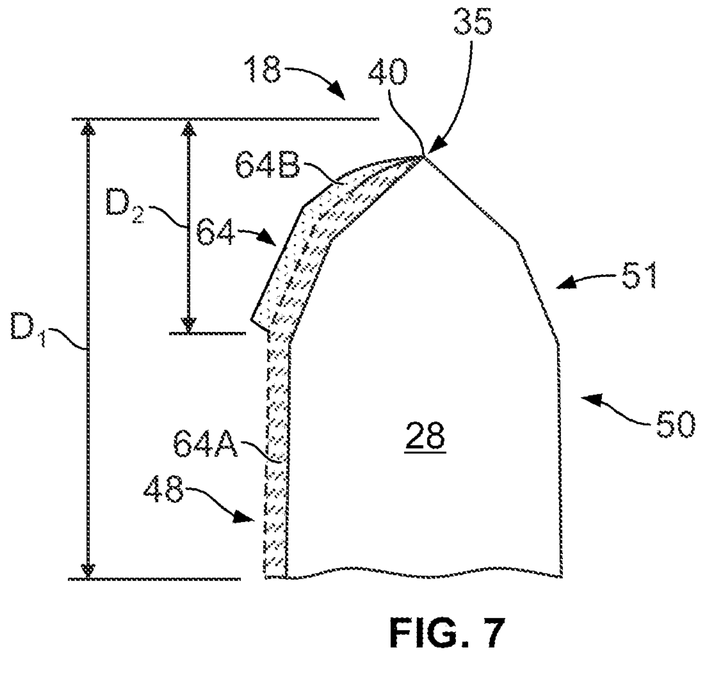
Figure 8:
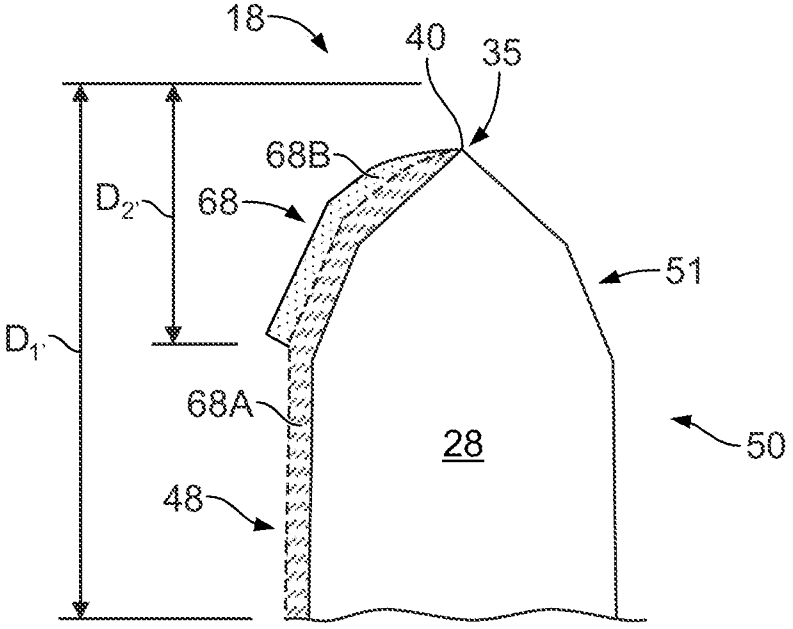

With reference to FIGS. 7 and 8 and the labeling of the substrate 28 in FIG. 4, a coating 64, 68 may comprise one or more layers including a respective first layer 64A, 68A and second layer 64B, 68B. The first layer 64A, 68A is disposed substantially on, and extends along a portion of, the first outer side 48 of the substrate 28 from the tip region 35 toward the base 32 for a respective first distance $D_1$, $D_{1'}$. The second layer 64B, 68B is formed on top of at least a portion of the respective first layer 64A, 68B and extends from the tip region 35 toward the base 32 for a respective second distance $D_2$, $D_{2'}$. In some examples, the second distance $D_2$, $D_{2'}$ may be less than the respective first distance $D_1$, $D_{1'}$. In FIG. 7, the first layer 64A may extend along the first outer side 48 from the tip region 35 onto the blade body 30 and toward the base 32, and the second layer 64B may be disposed substantially on the first and third facets 38A and 38C, with the second layer 64B extending from the tip region 35 to about the first junction 39-1 between the first facet 38A and the blade body 30. In FIG. 8, the first layer 68A may extend along the first outer side 48 from the tip region 35 onto the blade body 30 and toward the base 32, and the second layer 68B may be disposed substantially on the third facet 38C, with the second layer 68B extending from the tip region 35 to about the second junction 39-2 between the first and second facets 38A and 38B. In other examples, the second distance $D_2$, $D_{2'}$ may be about the same as the respective first distance $D_1$, $D_{1'}$. In some instances, the first and second layers may both be disposed on the first and third facets 38A and 38C or only on the third facet 38C. With continued reference to FIGS. 7 and 8, in some configurations, the coatings 64 and 68 may comprise two or more layers, e.g., the first layer 64A, 68A and the second layer 64B, 68B. In other configurations, the coatings 64 and 68 may comprise only the second layer 64B and 68B (the first 64A and 68A are shown in dashed lines in FIGS. 7 and 8 indicating that they are optional).

Figure 9:
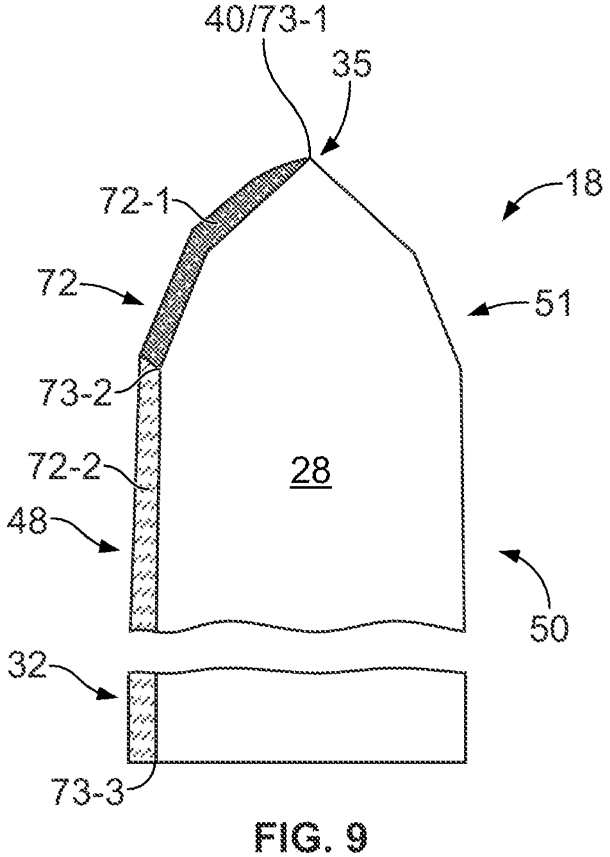
Figure 10:
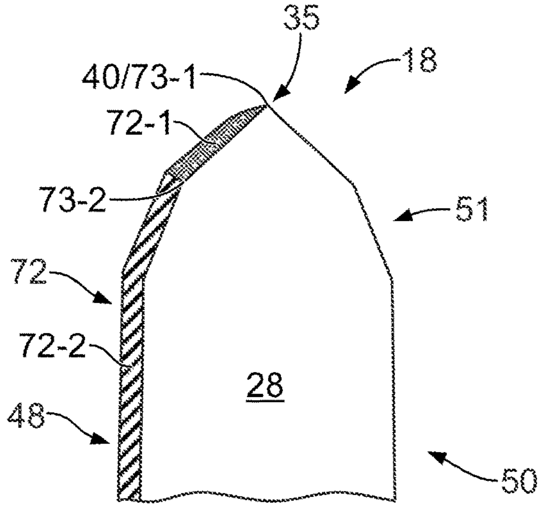
Figure 11:
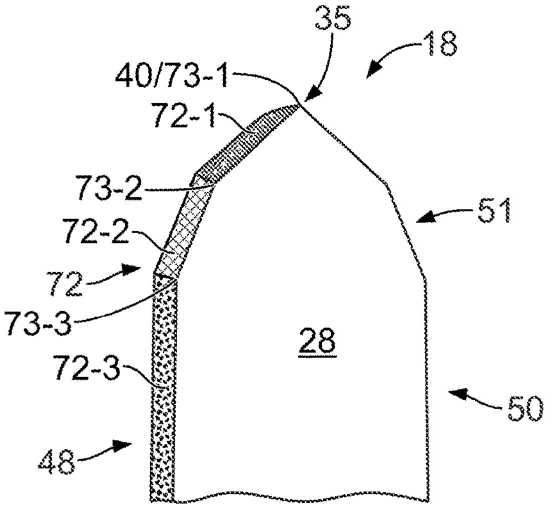

With reference to FIGS. 9-11, in further examples, a coating 72 substantially disposed on the first outer side 48 may comprise two or more sections. As shown in FIGS. 9 and 10, the coating 72 may comprise a first section 72-1 and a second section 72-2. The first section 72-1 of the coating 72 may extend along the first outer side 48 substantially from a first point or location 73-1, which may substantially correspond to a tip region 35 of the substrate 28, to a second point or location 73-2 on the first outer side 48. The second section 72-2 may extend substantially from the second location 73-2 to a third point or location 73-3 on the first outer side 48. With reference to FIG. 9 and the labeling of the substrate 28 in FIG. 4, the second location 73-2 may be positioned at about a junction between a facet and the blade body 30, e.g., junction 39-1 between the first facet 38A and the blade body 30, such that the first section 72-1 may be located substantially on the first and third facets 38A and 38C on the first outer side 48 and the second section 72-2 may be located substantially on the blade body 30. With reference to FIG. 10 and the labeling of the substrate 28 in FIG. 4, the second location 73-2 may be positioned at about a junction between two adjacent facets, e.g., junction 39-2 between the first and third facets 38A and 38C, such that the first section 72-1 is located substantially on the third facet 38C. In the examples depicted in FIGS. 9 and 10, the third location 73-3 may be spaced apart from the second location 73-2 and may be located, for example, toward or near the base 32 of the substrate 28, as shown in FIG. 9.

As shown in FIG. 11, the coating 72 may comprise first, second, and third sections 72-1, 72-2, and 72-3. The first section 72-1 may extend along the first outer side 48 substantially from a first point or location 73-1, which may substantially correspond to a tip region 35 of the substrate 28, to a second point or location 73-2 on the first outer side 48; the second section 72-2 may extend substantially from the second location 73-2 to a third point or location 73-3 on the first outer side 48; and the third section 72-3 may extend substantially from the third location 73-3 to a fourth point or location (not shown) on the first outer side 48. With reference to FIG. 11 and the labeling of the substrate 28 in FIG. 4, the second location 73-2 may be positioned at about the junction 39-2 between the first and third facets 38A and 38C, and the third location 73-3 may be positioned at about the junction 39-1 between the first facet 38A and the blade body, such that the first and second sections 72-1 and 72-2 may be disposed substantially on the first and third facets 38A and 38C, respectively, and the third section 72-3 may be located substantially on the blade body 30. The fourth location may be spaced apart from the third location 73-3 and may be located, for example, toward or near the base 32 of the substrate 28.

Figure 12:
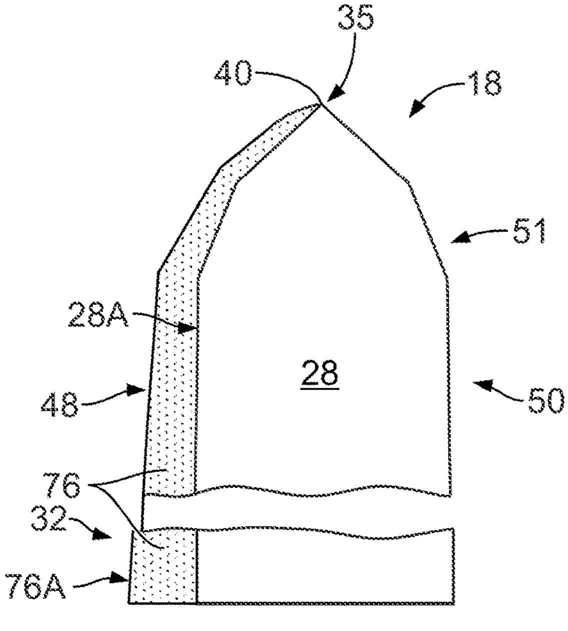

With reference to FIG. 12, in further examples, the substrate 28 may comprise a coating 76 with a thickness that varies along at least a section of the coating 76 in a direction extending from the tip region 35 toward the base 32, in which the thickness is measured between an outer surface 76A of the coating 76 and an outer surface 28A of the substrate 28. The coating 76 may, for example, increase in thickness, as shown in FIG. 12.

Figure 14:
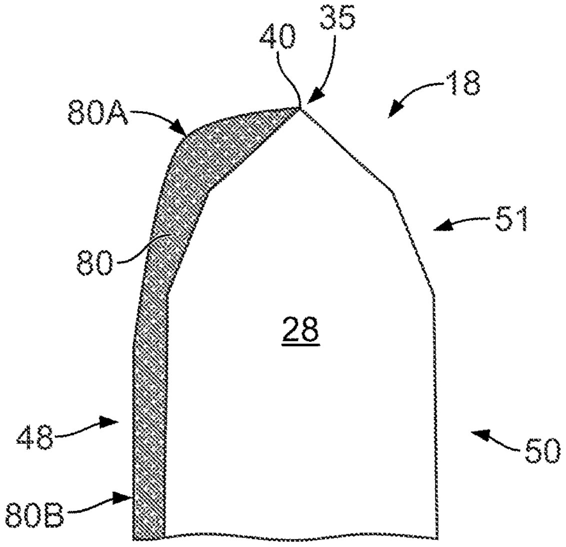

In the examples shown in FIGS. 4-12, an outer shape of the coatings 60, 64, 68, 72, and 76 (and all layers or sections thereof) generally conform to and/or mirror an outer shape of the underlying portions of the substrate 28 on which the coatings are formed. In other examples, as shown in FIG. 14, the substrate 28 may comprise a coating 80 with one or more sections that define an outer shape that is different from an outer shape of an underlying portion of the substrate 28. The coating 80 may comprise a thickened section 80A where the coating 80 bulges outward from the substrate 28 and forms an outer shape that is different from an outer shape of one or more of the underlying portions of the substrate 28, e.g., the first and third facet outer surfaces (not labeled; see facet outer surfaces 39A and 39C in FIG. 4). The coating 80 may optionally comprise a second section 80B with an outer shape that conforms more closely to the outer shape of the underlying portion(s), e.g., the first blade body outer surface (not labeled; see blade body outer surface 31A in FIG. 4), of the substrate 28.

In FIGS. 4-17, the coating 60, 64, 68, 72, 76, and 80 may be disposed on one or both of the first facets (i.e., the first and/or third facets 38A and 38C) on the first outer side 48, and the portion 51 of the second outer side 50 that is free of any coating may comprise at least a portion of one or both of the second facets (i.e., the second and/or fourth facets 38B and 38D). In the examples shown in FIGS. 4-14, the portion 51 of the second outer side 50 that is substantially free of any coating may comprise substantially an entirety of the second outer side 50. In the examples shown in FIGS. 15-17, the portion 51 that is substantially free of any coating may comprise only part of the second outer side 50 (also referred to herein as a first portion or an uncoated portion). A second portion 53 of the second outer side 50 may comprise a second coating 62 disposed substantially thereon, such that only part of the second outer side 50 is uncoated.

Figure 15:
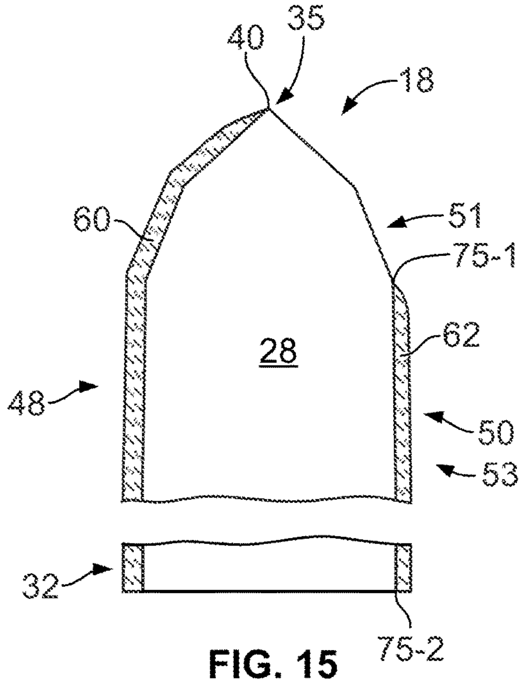
Figure 16:
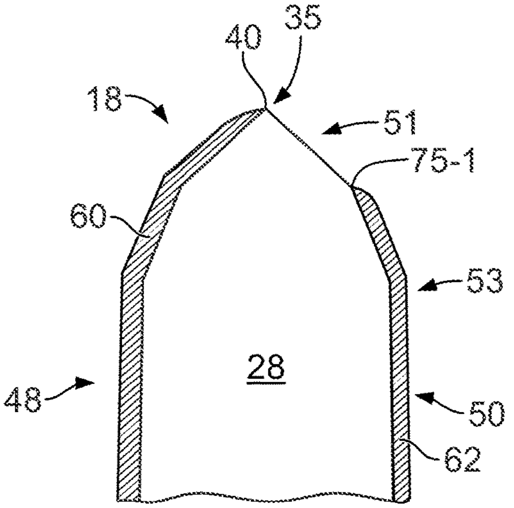
Figure 17:
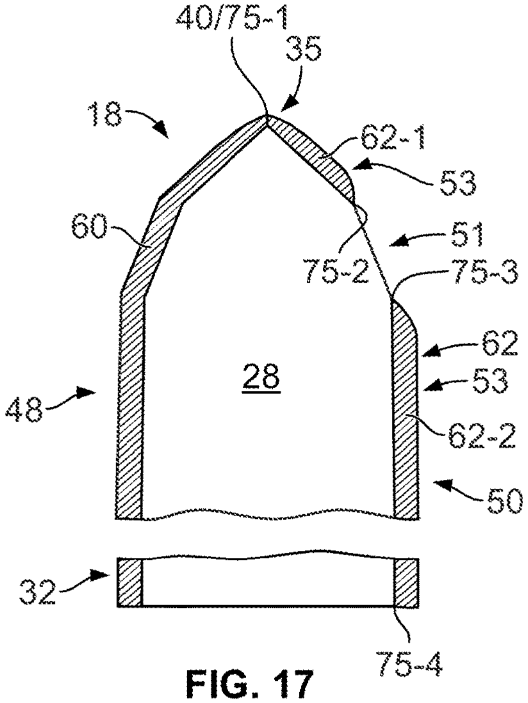

With reference to FIGS. 15 and 16 and the labeling of the substrate 28 in FIG. 4, the first portion 51 of the second outer side 50 that is substantially free of any coating may extend from the tip region 35 toward the base 32, and the second coating 62 may extend substantially from a first location 75-1 to a second location 75-2, in which the first location 75-1 is spaced apart from the tip region 35 and the second location 75-2 is located toward the base 32. In FIG. 15, the first location 75-1 may substantially correspond to the junction 39-3 between the blade body 30 and the fourth facet 38D, such that the uncoated portion 51 of the second outer side 50 may comprise substantially an entirety of the second and fourth facets 38B and 38D. In FIG. 16, the first location 75-1 may substantially correspond to the junction 39-4 between the second and fourth facets 38B and 38D, such that the uncoated portion 51 of the second outer side 50 may comprise substantially an entirety of the fourth facet 38D. It may be understood that the second coating 62 may be disposed so that the uncoated portion 51 of the second outer side 50 is located at any desired location within these parameters.

With reference to FIG. 17 and the labeling of the substrate 28 in FIG. 4, in further examples, the second coating 62 may comprise first and second sections 62-1 and 62-2, and the uncoated portion 51 of the second outer side 50 may be located between the first and second sections 62-1 and 62-2 of the second coating 62 such that the uncoated portion 51 is spaced apart from the tip region 35 and the base 32. For example, the first section 62-1 of the second coating 62 may extend substantially from a first location 75-1 to a second location 75-2, and the second section 62-2 may extend substantially from a third location 75-3 to a fourth location 75-4. The first location 75-1 may substantially correspond to the tip region 35 of the substrate 28, and the second location 75-2 may be spaced apart from the third location 75-3. In the example shown in FIG. 17, the second location 75-2 may substantially correspond to the junction 39-4 between the second and fourth facets 38B and 38D; the third location 75-3 may substantially correspond to the junction 39-3 between the blade body 30 and the fourth facet 38D; and the fourth location 75-4 may be located toward the base 32 of the substrate 28, such that the uncoated portion 51 of the second outer side 50 may comprise substantially an entirety of the second facet 38B. It is understood that the sections 62-1 and 62-2 of the second coating 62 may be disposed so that the uncoated portion 51 of the second outer side 50 is located at any desired location within these parameters.

In all examples, each coating may comprise one or more materials. In examples in which the substrate 28 comprises a coating with multiple layers as shown in FIGS. 5-8, the layers may comprise the same materials or one or more different materials, as compared to each other. For example, a first layer of a coating may comprise one or more first materials, and a second layer of the coating may comprise one or more second materials, in which at least one of the second materials is different from at least one of the first materials. In examples in which the substrate 28 comprises a coating with two or more sections as shown in FIGS. 9-11, each section may comprise a different material, as compared to an adjacent or neighboring section. In examples in which the substrate 28 comprises first and second coatings as shown in FIGS. 15-17, the coatings may comprise the same materials or one or more different materials, as compared to each other. For example, the first coating may comprise one or more first materials, and the second coating may comprise one or more second materials, in which at least one of the second materials is different from at least one of the first materials.

The materials may comprise one or more carbon-containing materials (e.g., diamond, amorphous diamond, nanocrystalline diamond, or diamond like carbon (DLC)); nitrides (e.g., boron nitride, niobium nitride, chromium nitride, titanium nitride, aluminum titanium nitride, titanium carbon nitride), carbides (e.g., silicon carbide or chromium carbide), oxides (e.g., alumina, zirconia), titanium diboride, one or more ceramic materials, a fluorinated polymer (e.g., polytetrafluoroethylene (PTFE)), a polyolefin (e.g., polypropylene), niobium, chromium, and platinum chromium. The carbon-containing materials can be doped with other elements, such as tungsten, titanium, or chromium by including these additives, for example, in the target during application by sputtering. The materials can also incorporate hydrogen, e.g., hydrogenated DLC. The materials may comprise one or more nanocomposites such as carbon-based nanocomposites, metal-matrix nanocomposites, and/or ceramic-matrix nanocomposites; e.g., diamond and carbon and nanocomposites.

The material(s) may be selected based, at least in part, on a coefficient of friction of the material(s), with the materials of the various coatings and/or layers and/or sections thereof comprising one or more materials with a different coefficient of friction, as compared to each other. For example, the coating 60 in FIG. 4 or an outer layer 60B, 60C, 64B, 68B thereof in FIGS. 5-7 may comprise a material with a low coefficient of friction such as PTFE, particularly when the first outer side 48 of the substrate 28 at least partially defines the skin-contacting surface. When present, the second coating 62 (see FIGS. 15-17) may comprise a material with a higher coefficient of friction than PTFE, such as polypropylene.

The material(s) of the coatings and/or layers and/or sections thereof may also be selected based, at least in part, on morphology, which may include microstructure (e.g., amorphous, columnar, crystalline, dense, porous, etc.) A porous microstructure may improve adhesion of a subsequent polymer coating. The desired morphology may be obtained, for example, by applying the coatings and/or layers and/or sections thereof via different application techniques or via the same application technique with differing application speeds, as described herein.

The material(s) of the coatings and/or layers and/or sections thereof may further be selected based, at least in part, on a hardness of the material(s). One coating and/or layer and/or section thereof may comprise a first hardness, and another coating and/or layer and/or section thereof may comprise a second hardness. In some examples, the first hardness may be greater than about 7 GPa, and the second hardness may be greater than about twice the first hardness, e.g., greater than about 15 GPa. In other examples, the first hardness may be between about 7 GPa to about 10 GPa, and the second hardness may be between about 15 GPa to about 60 GPa. As used herein with respect to hardness, the term "about" may mean±0.5 GPa.

A texture of the coatings and/or layers and/or sections thereof may also be selected. For example, the coating 60 in FIG. 4 or an outer layer 60B, 60C, 64B, 68B thereof in FIGS. 5-7 may comprise a substantially smooth texture, particularly when the first outer side 48 of the substrate 28 at least partially defines the skin-contacting surface. When present, the second coating 62 (see FIGS. 15-17) may comprise a discontinuous or more coarse texture that may include protrusions. The desired texture may be obtained by, for example, applying the coatings and/or layers and/or sections thereof via different application techniques or via the same application technique with differing application speeds, as described herein. The texture may also be altered via one or more post-application treatment methods, as described herein.

Figure 13:
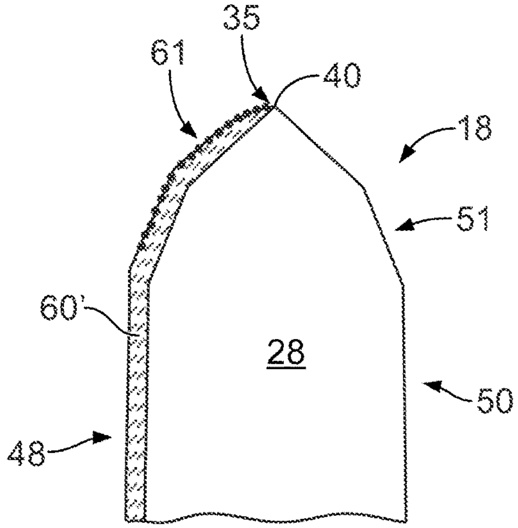

In further examples, at least a section of the coatings and/or layers and/or sections thereof may be subjected to one or more post-application treatments (e.g., modification of a surface of the coating and/or modification of one or more layers of the coating). For instance, one or more sections of the coatings and/or layers and/or sections thereof may be subjected to ion implantation. With reference to FIG. 13, at least a section of a coating 60' may comprise an ion-implanted material 61. The ion-implanted material 61 may comprise, for example, a plasma-nitrided material or a plasma-borided material. The ion implantation may be performed as described herein and may be performed on all or part of the coating 60'. The one or more post-application treatments may also comprise altering a texture of the coatings and/or layers and/or sections thereof. For example, the coatings and/or layers and/or sections thereof may be subjected to chemical modification (e.g., solvent treatment) and/or mechanical modification (e.g., ion etching, ion implantation, abrading, rubbing, polishing, etc.) to alter a surface texture.

The one or more post-application treatments may further comprise partially removing the coatings and/or layers and/or sections thereof, e.g., by solvent treatment, ion etching, etc. Partial removal may comprise, for example, removal of all or part of a thickness of the coating (i.e., in a direction substantially perpendicular to an underlying portion of the substrate) along one or more sections of the second coating, in which at least a portion of the the coating remains intact. In some examples, the partial removal of the one or more portions of the coating may be followed by one or more additional post-application treatments comprising selectively applying material to the coating from which material was partially removed. The selectively-applied material may be applied using any suitable method. The selectively-applied material may comprise, for example, a polymer or an organic compound, such as a fluropolymer, PTFE, or polypropylene. In some particular examples, the portion(s) of the coating to which material is selectively applied may define a skin-contacting surface of the razor blade.

With reference now to FIGS. 20-33, the razor blade 118 may comprise one or more coatings that are substantially similar to the razor blade 18 depicted in FIGS. 4-17 and described herein in detail, in which one of the first or the second outer side 148 or 150 of the substrate 128 may comprise a coating and at least a portion 149 or 151 of the other of the first or the second outer side 148 or 150 of the substrate 128 may be substantially free of any coating. In some particular examples in which the first outer side 148 comprises the coating, at least a portion of the first outer side 148 may define a skin-contacting surface. The portion 149, 151 may extend from the tip region 135 toward the base 132, as shown in FIGS. 20-32, or may be spaced apart from the tip region 135 and the base 132, as shown in FIG. 33.

Figure 20A:
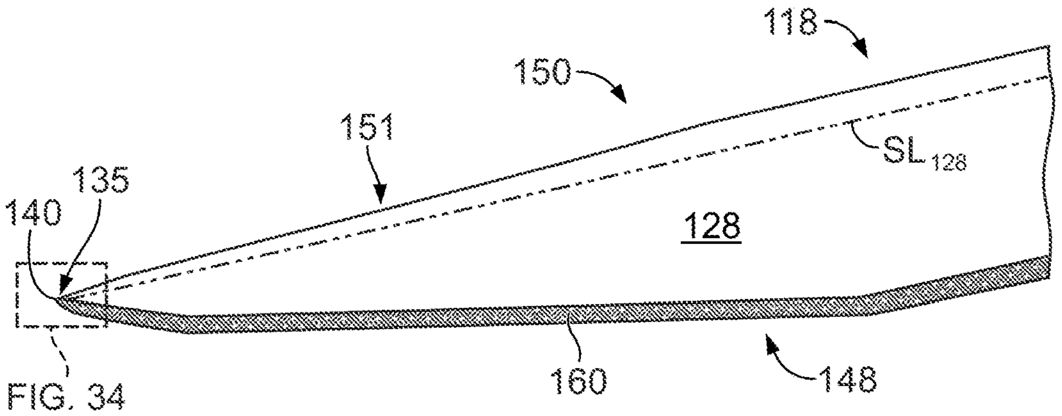
FIGS. 20A, 20B, 21A, 21B, 22A, 22B, 23A, 23B, 24A, 24B, 25A, 25B, 26A, 26B, 27A, 27B, 28A, 28B, 29A, 29B, 30A, 30B, 31, 32 and 33 are side views of a tip portion of the razor blade of FIG. 18 comprising one or more coatings in accordance with the present disclosure.
Figure 20B:
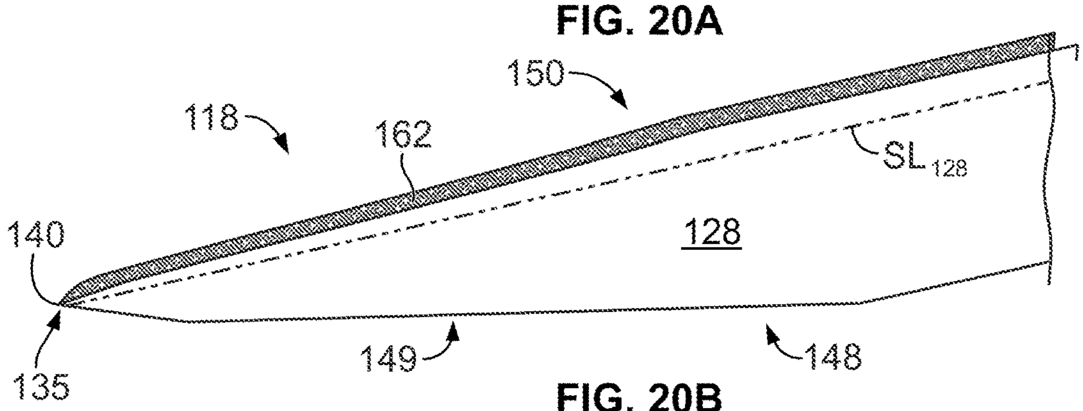
Figure 21A:
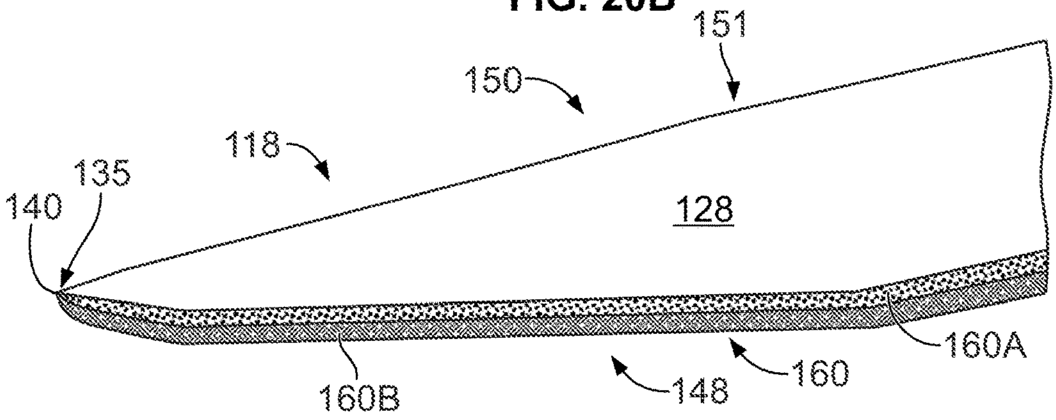
Figure 21B:
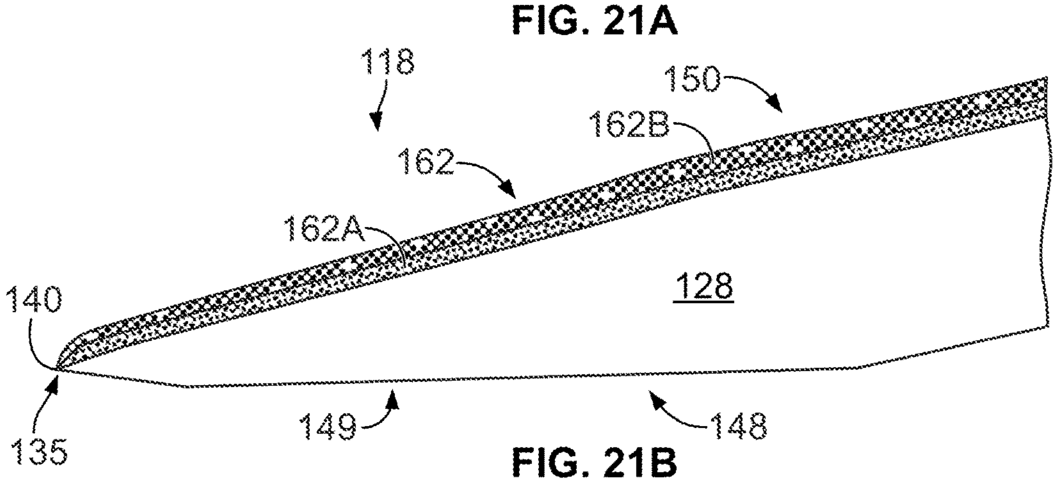
Figure 22A:
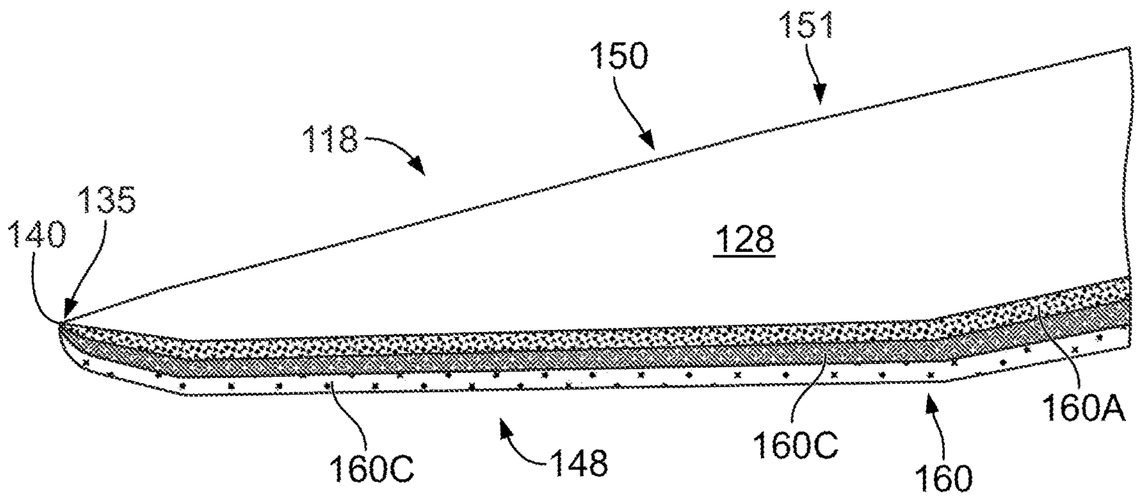
Figure 22B:
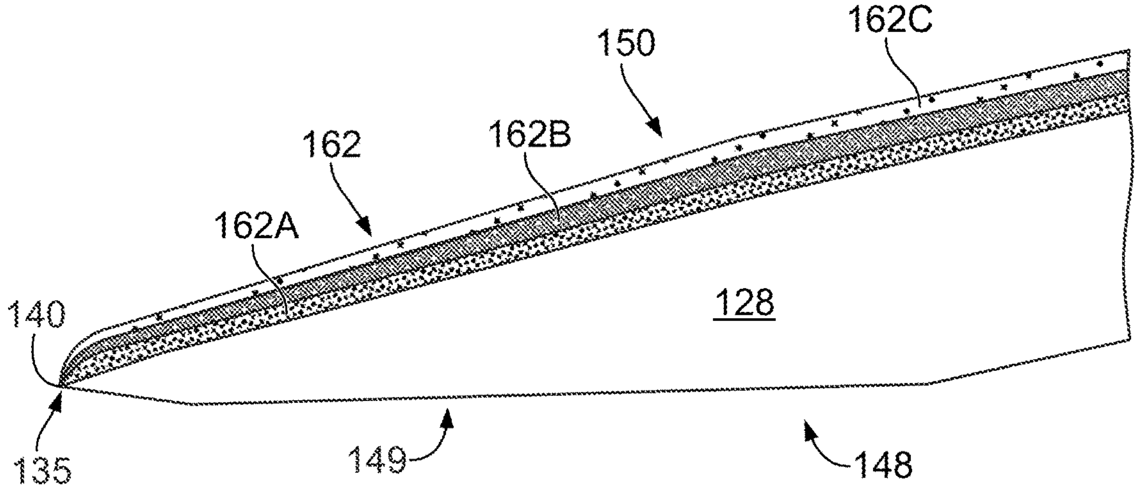

As shown in FIGS. 20A, 21A, and 22A, the razor blade 118 may comprise a coating 160 disposed substantially on the first outer side 148 of the substrate 128 and extending along the first outer side 148 from the tip region 135 toward the base (not shown; see base 132 in FIG. 18). The portion 151 of the second outer side 150 that is substantially free of any coating may extend from the tip region 135 toward the base. The coating 160 may comprise a single layer of material, as shown in FIG. 20A, or a plurality of layers of material(s), e.g., first, second, and/or third layers 160A, 160B, and/or 160C, as shown in FIGS. 21A and 22A. The first layer 160A is disposed substantially on the first outer side 148; the second layer 160B is formed on top of at least a portion of the first layer 160A; and when present, the third layer 160C is formed on top of at least a portion of the second layer 160B. FIGS. 20B, 21B, and 22B depict alternative configurations of respective ones of FIGS. 20A, 21A, and 22A, in which the razor blade 118 comprises a coating 162 disposed substantially on the second outer side 150 of the substrate 128 and the first outer side 148 comprises the portion 149 that is substantially free of any coating. The coating 162 extends along the first outer side 150 from the tip region 135 toward the base (not shown; see base 132 in FIG. 18). The portion 149 that is substantially free of any coating may extend from the tip region 135 toward the base. The coating 162 may comprise a single layer of material, as shown in FIG. 20B, or a plurality of layers of material(s), e.g., first, second, and/or third layers 162A, 162B, and/or 162C, as shown in FIGS. 21B and 22B. As described herein, the coating(s) 160, 162 and/or any of the layers 160A-160C, 162A-162C thereof may be subjected to ion implantation to generate, for example, a layer 160' or 162' comprising an ion-implanted material 161 or 163, respectively, shown in FIGS. 29A and 29B.

In the examples shown in FIGS. 20-22, the coatings 160 and 162 (including all layers 160A-160C and 162A-162C thereof) are depicted as extending along the respective outer side 148 or 150 of the substrate 128 from the tip region 135 onto the blade body (not labeled; see blade body 130 in FIG. 18), and in some instances, may extend all the way to the base (not shown; see base 132 in FIG. 18) of the razor blade 118. In other examples, the coatings and/or one or more layers thereof may stop short of the blade body and/or the base, and in some particular examples, the coatings and/or one or more layers thereof may be disposed substantially only on the tip portion (not labeled; see 134 in FIG. 18) of the substrate 128, e.g., on one or both of the first and third facets or one or both of the second and fourth facets (not labeled; see facets 138A to 138D in FIG. 18).

Figure 23A:
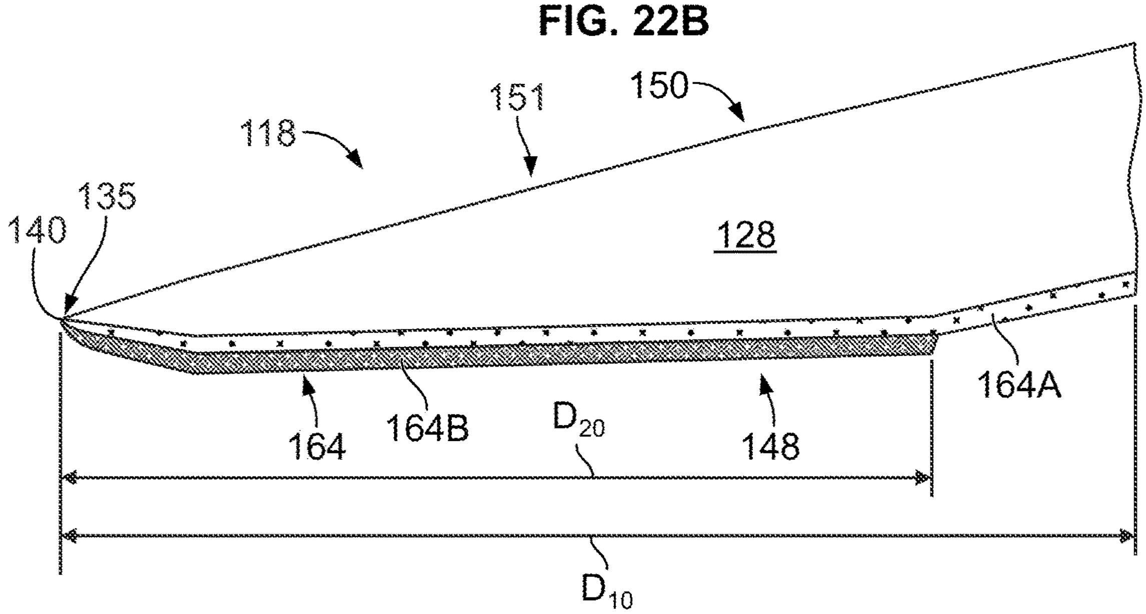
Figure 24A:
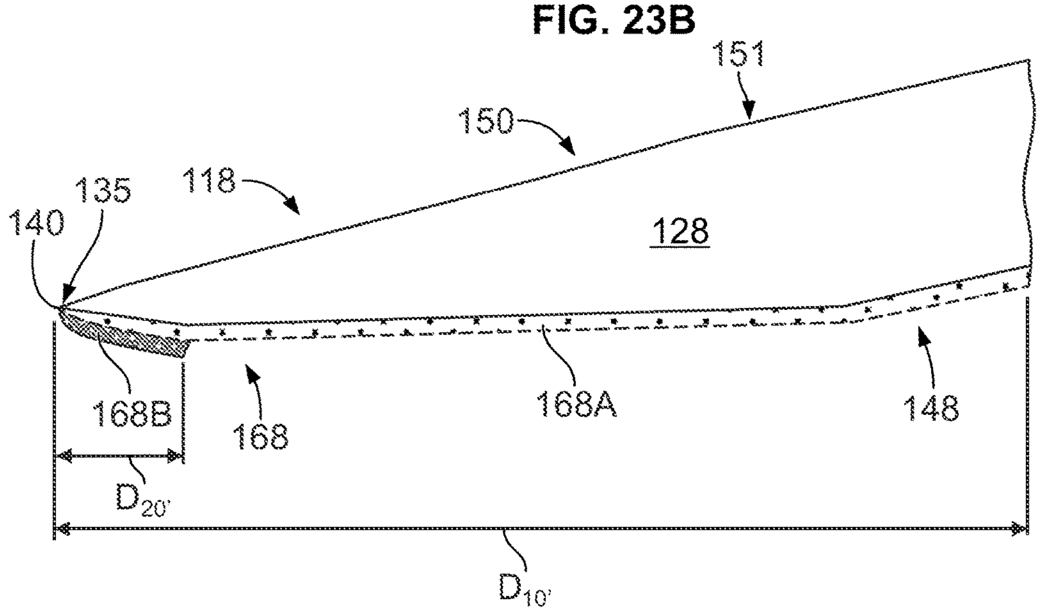

With reference to FIGS. 23A and 24A and the labeling of the substrate 128 in FIG. 18, a coating 164, 168 may comprise one or more layers including a first layer 164A, 168A that is disposed substantially on, and extends along a portion of, the first outer side 148 of the substrate 128 from the tip region 135 toward the base 132 for a respective first distance $D_{10}$, $D_{10'}$; and a second layer 164B, 168B that is formed on top of at least a portion of the respective first layer 164A, 168B and extends from the tip region 135 toward the base 132 for a respective second distance $D_{20}$, $D_{20'}$. In some examples, the second distance $D_{20}$, $D_{20'}$ may be less than the respective first distance $D_{10}$, $D_{10'}$. In FIG. 23A, the first layer

164A may extend along the first outer side 148 from the tip region 135 onto the blade body 130 and toward the base 132, and the second layer 164B may be disposed substantially on the first and third facets 138A and 138C, with the second layer 164B extending from the tip region 135 to about the first junction 139-1 between the first facet 138A and the blade body 130. In FIG. 24A, the first layer 168A may extend along the first outer side 148 from the tip region 135 onto the blade body 130 and toward the base 132, and the second layer 168B may be disposed substantially on the third facet 138C, with the second layer 168B extending from the tip region 135 to about the second junction 139-2 between the first and second facets 138A and 138B. In other examples, the second distance $D_{20}$, $D_{20'}$ may be about the same as the respective first distance $D_{10}$, $D_{10'}$. In some instances (not shown), the first and second layers may both be disposed on the first and third facets 138A and 138C or only on the third facet 138C.

Figure 23B:
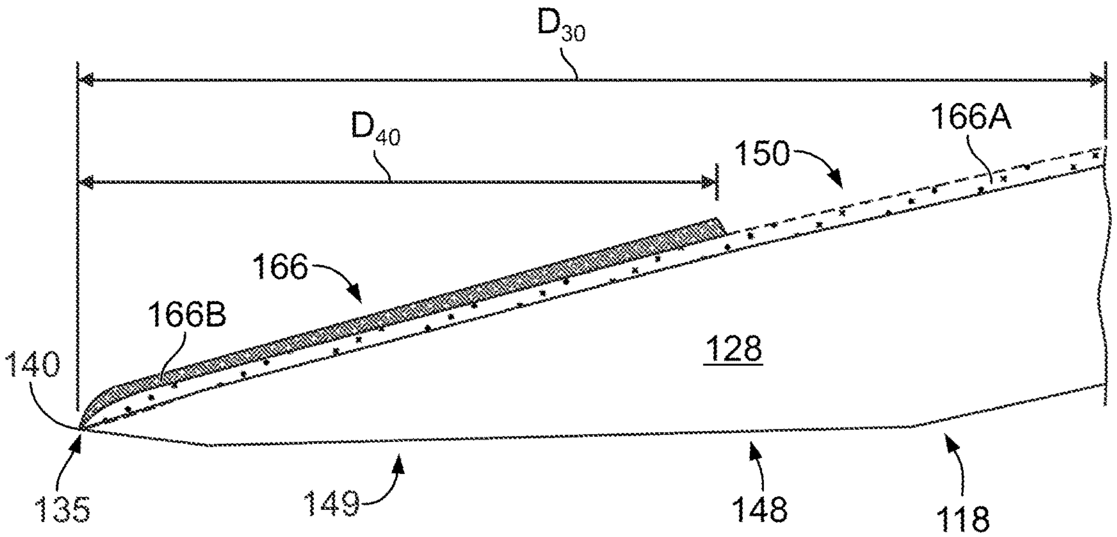
Figure 24B:
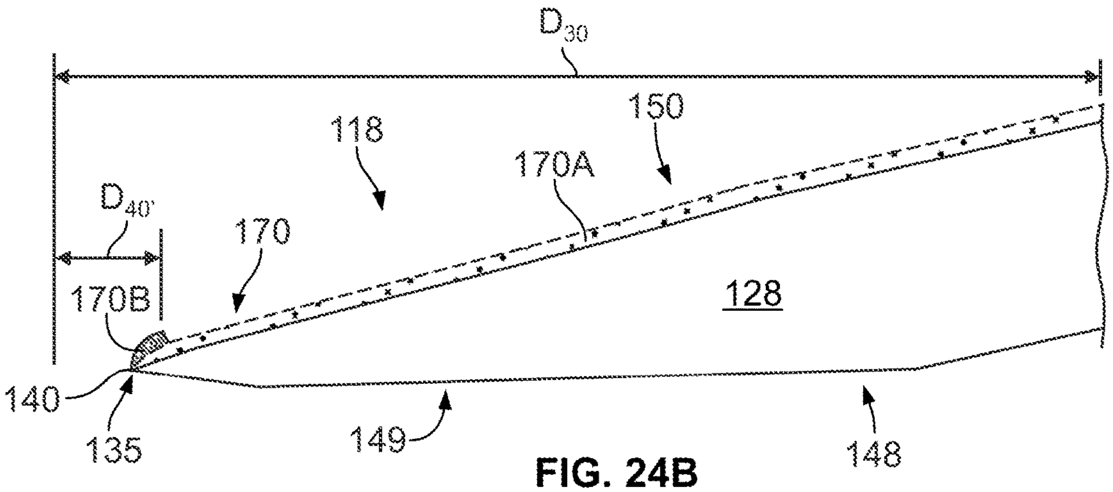

FIGS. 23B and 24B depict alternative configurations of FIGS. 23A and 24A, respectively, in which the second outer side 150 comprises a coating 166, 170 disposed substantially thereon, in which each coating 166, 170 may comprise one or more layers including a respective first layer 166A, 170A and second layer 166B, 170B. Each first layer 166A, 170A extends along a portion of the second outer side 150 from the tip region 135 toward the base (not shown; see base 132 in FIG. 18) for a respective third distance $D_{30}$, $D_{30'}$; and each second layer 166B, 170B extends from the tip region 135 toward the base for a respective fourth distance $D_{40}$, $D_{40'}$. In some examples, the fourth distance $D_{40}$, $D_{40'}$ may be less than the respective third distance $D_{30}$, $D_{30'}$, e.g., the second layer 166B of the coating 166 in FIG. 23B is disposed substantially on the second and fourth facets (not labeled; see facets 138B and 138D in FIG. 18) and the second layer 170B of the coating 170 in FIG. 24B is disposed substantially on the fourth facet. In other examples, the fourth distance $D_{40}$, $D_{40'}$ may be about the same as the respective third distance $D_{30}$, $D_{30'}$. In the examples depicted in FIGS. 23 and 24, the coatings 164, 166, 168, and 170 may comprise two layers, e.g., respective first layers 164A, 166A, 168A, and 170A and second layers 164B, 166B, 168B, and 170B. In other configurations, the coatings 164, 166, 168, and 170 may comprise only the second layer 164B, 166B, 168B, and 170B (the first layers 164A, 166A, 168A, and 170A are shown in dashed lines in FIGS. 23 and 24 indicating that they are optional).

Figure 25A:
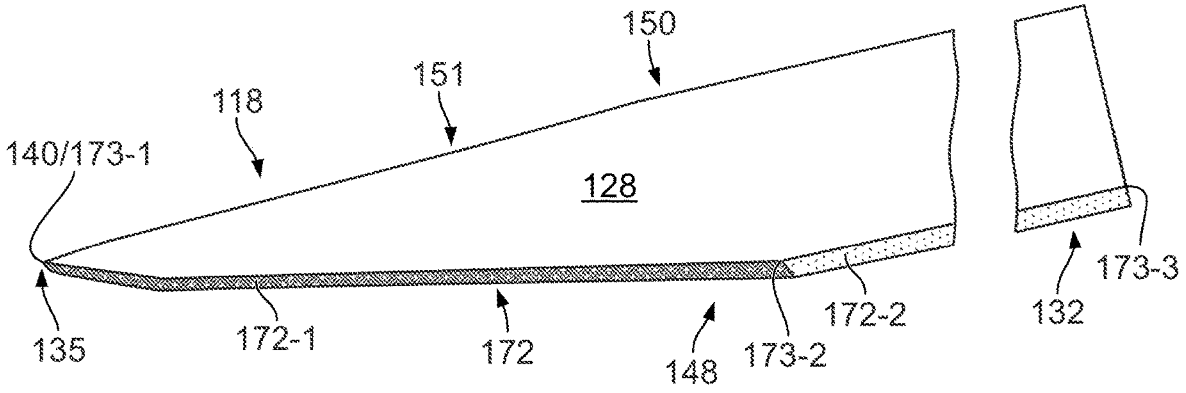
Figure 26A:
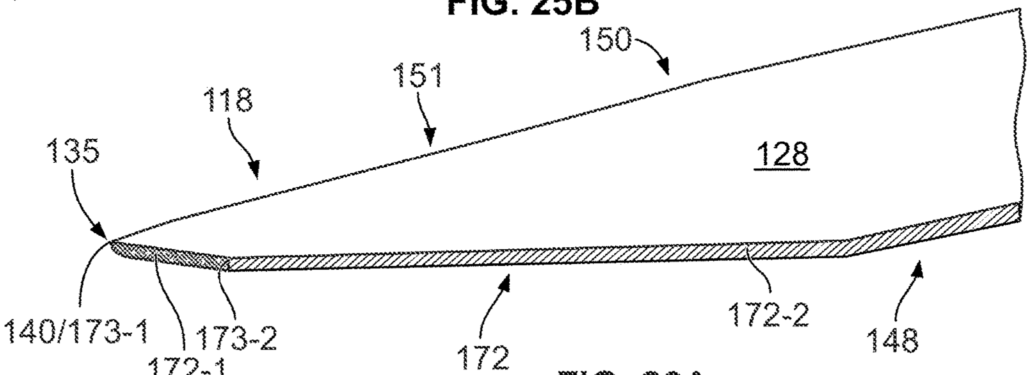
Figure 27A:
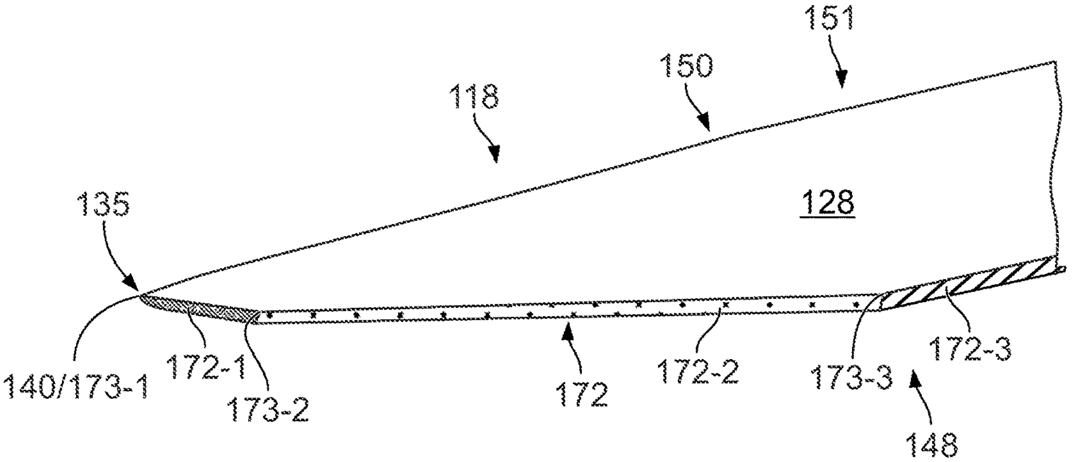

With reference to FIGS. 25A, 26A, and 27A, in further examples, a coating 172 may comprise two or more sections, including a first section 172-1, a second section 172-2, and a third section 172-3. The first section 172-1 may extend along the first outer side 148 substantially from a first point or location 173-1, which may substantially correspond to a tip region 135 of the substrate 128, to a second point or location 173-2; the second section 172-2 may extend substantially from the second location 173-2 to a third point or location 173-3; and when present, the third section 172-3 may extend substantially from the third location 173-3 to a fourth point or location (not shown). With reference to FIG. 25A and the labeling of the substrate 118 in FIG. 18, the second location 173-2 may be positioned at about the junction 139-1 between the first facet 138A and the blade body 130, such that the first section 172-1 may be located substantially on the first and third facets 138A and 138C, and the second section 172-2 may be located substantially on the blade body 130. With reference to FIG. 26A and the labeling of the substrate 118 in FIG. 18, the second location 173-2 may be positioned at about the junction 139-2 between the first and third facets 138A and 138C, such that the first section 172-1 may be located substantially on the third facet 138C. In the examples depicted in FIGS. 25A and 26A, the third location 173-3 may be spaced apart from the second location 173-2 and may be located, for example, toward or near the base 132 of the substrate 128, as shown in FIG. 25A. With reference to FIG. 27A and the labeling of the substrate 118 in FIG. 18, the second location 173-2 may be positioned at about the junction 139-2 between the first and third facets 138A and 138C, and the third location 173-3 may be positioned at about the junction 139-1 between the first facet 138A and the blade body 130, such that the first and second sections 172-1 and 172-2 may be disposed substantially on the first and third facets 138A and 138C, respectively, and the third section 172-3 may be located substantially on the blade body 130. The fourth location (not shown) may be spaced apart from the third location 173-3 and may be located, for example, toward or near the base 132 of the substrate 128.

Figure 25B:
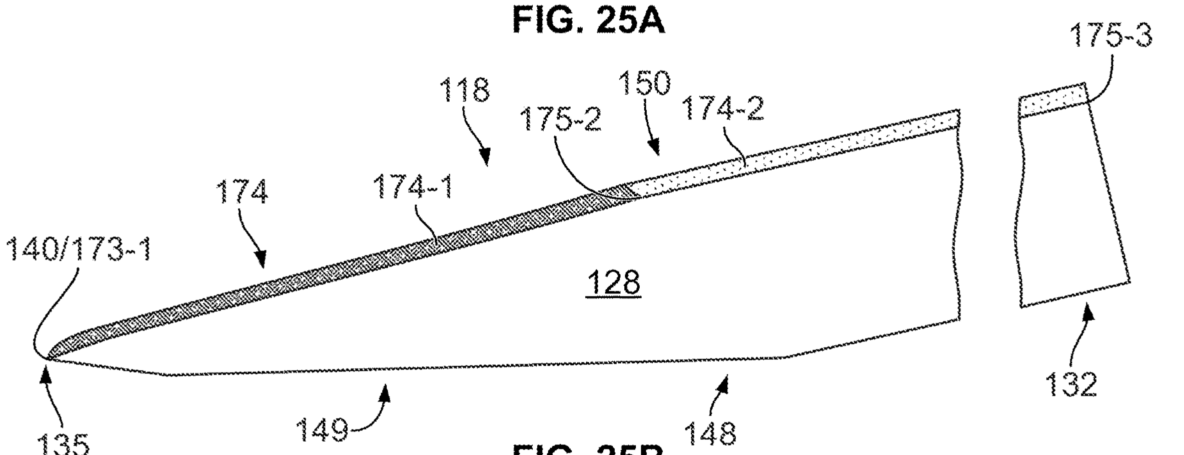
Figure 26B:
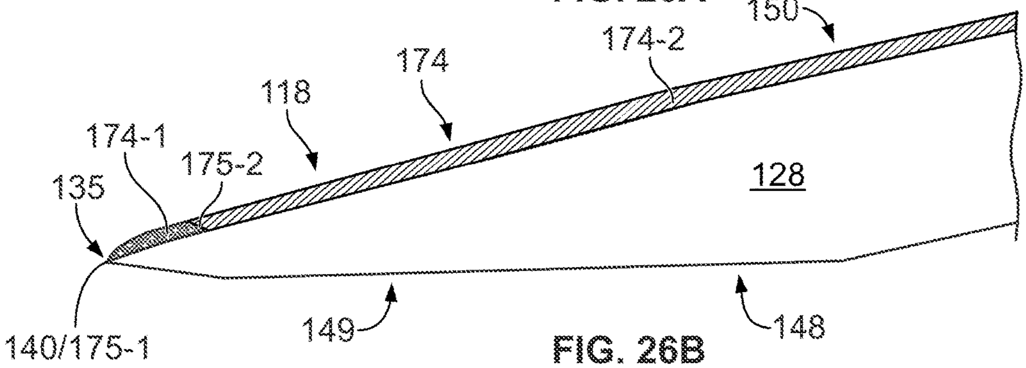
Figure 27B:
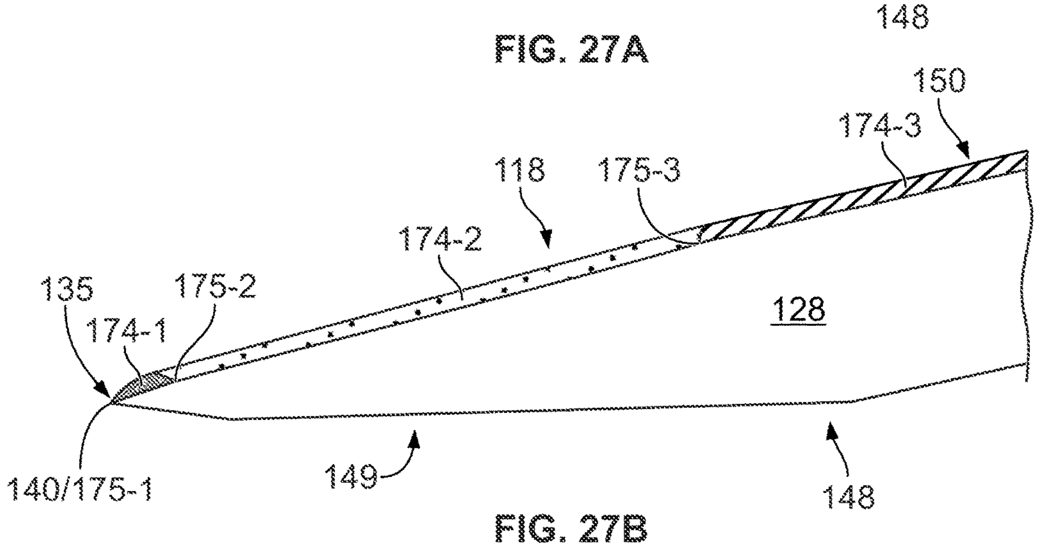

FIGS. 25B, 26B, and 27B depict alternative configurations of FIGS. 25A, 26A, and 27A, respectively, in which the second outer side 150 comprises a coating 174 comprising two or more sections, including a first section 174-1, a second section 174-2, and a third section 174-3. The first section 174-1 may extend along the second outer side 150 substantially from a first point or location 175-1 (may substantially correspond to a tip region 135 of the substrate 128) to a second point or location 175-2; the second section 174-2 may extend substantially from the second location 175-2 to a third point or location 175-3, and when present, the third section 174-3 may extend substantially from the third location 175-3 to a fourth point or location (not shown).

Figure 28A:
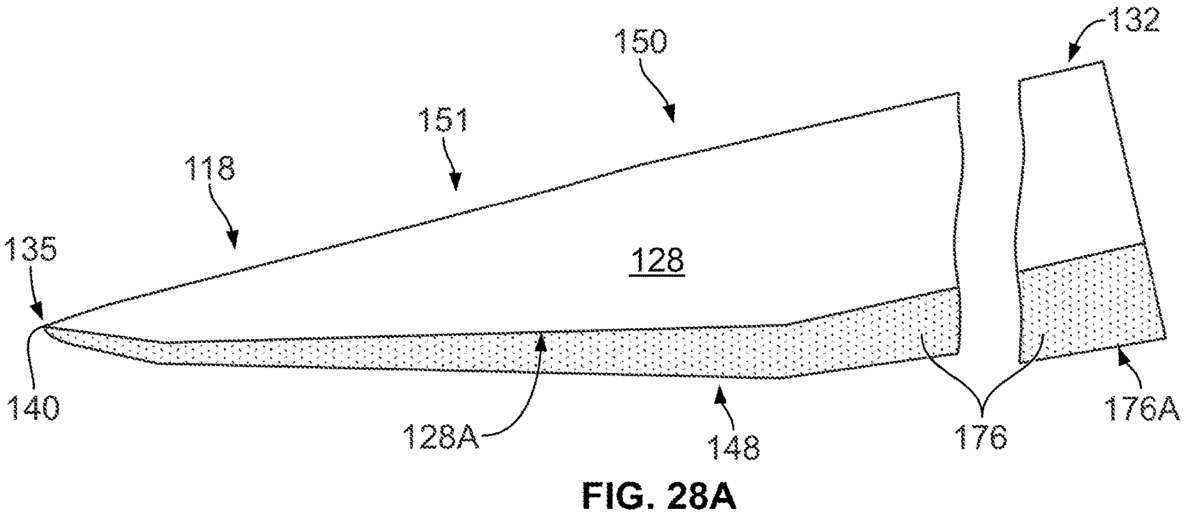
Figure 28B:
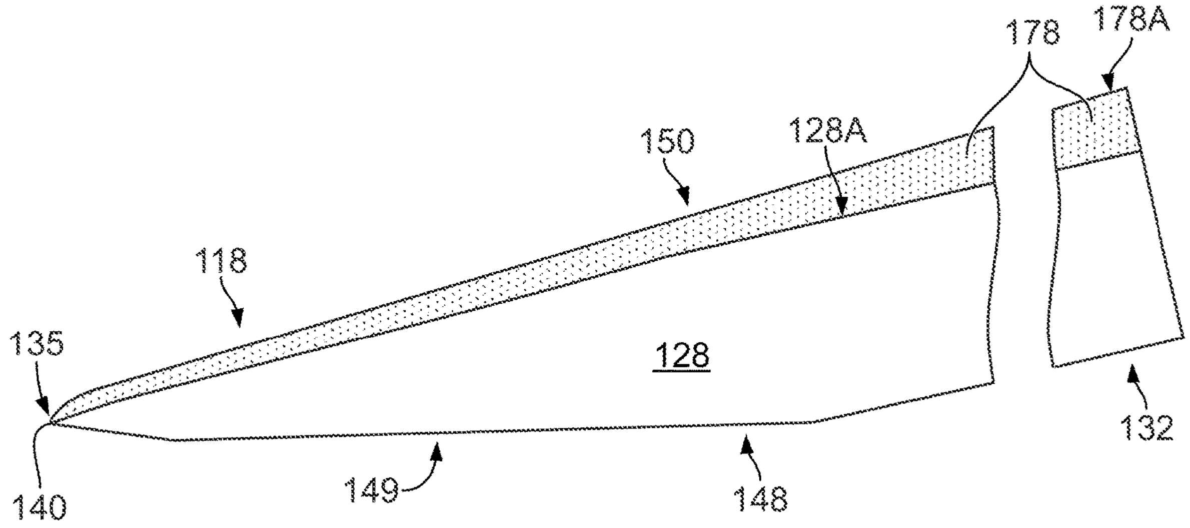

With reference to FIGS. 28A and 28B, in further examples, one of the first or the second outer side 148 or 150 of the substrate 128 may comprise a respective coating 176 or 178 with a thickness that varies along at least a section of the coating 176 and 178 in a direction extending from the tip region 135 toward the base 132. The thickness of the coating 176 and 178 may be measured between an outer surface 176A, 178A of the respective coating 176 and 178 and an outer surface 128A of the substrate 128. The coatings 176 and 178 may, for example, increase in thickness, as shown in FIGS. 28A and 28B.

Figure 30A:
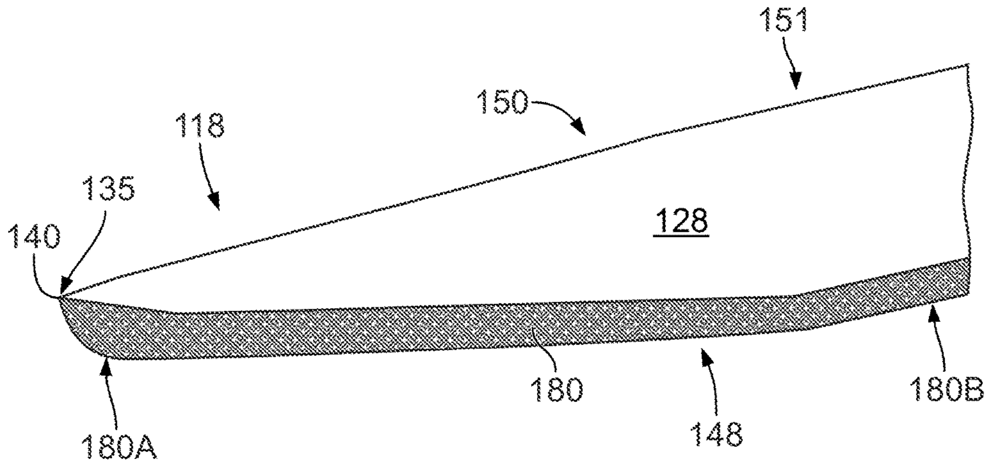
Figure 30B:
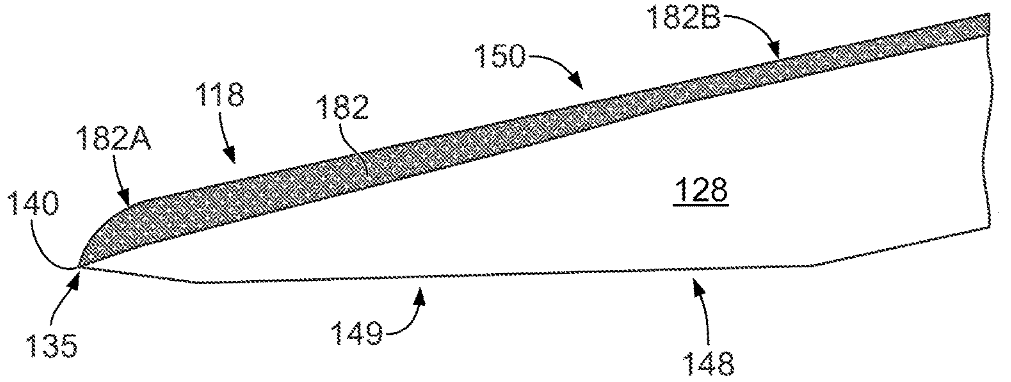

In the examples shown in FIGS. 20-28, an outer shape of the coatings 160, 162, 164, 166, 168, 170, 172, 174, 176, and 178 (and all layers or sections thereof) generally conform to and/or mirror an outer shape of the underlying portions of the substrate 128 on which the coatings are formed. In other examples, as shown in FIGS. 30A and 30B, the substrate 128 may comprise a coating 180 or 182 with one or more sections that define an outer shape that is different from an outer shape of an underlying portion of the substrate 128. As shown in FIG. 30A, the coating 180 may be disposed substantially on the first outer side 148 and may comprise a thickened section 180A where the coating 180 bulges outward from the substrate 128 and forms an outer shape that is different from an outer shape of one or more of the underlying portions of the substrate 128, e.g., the third facet outer surface and at least a portion of the first facet outer surface (not labeled; see facet outer surfaces 139A and 139C in FIG. 18). As shown in FIG. 30B, the coating 182 may be disposed substantially on the second outer side 150 and may comprise a thickened section 182A where the coating 182 bulges outward from the substrate 128 and forms an outer shape that is different from an outer shape of one or more of the underlying portions of the substrate 128, e.g., the fourth facet outer surface and at least a portion of the second facet outer surface (not labeled; see facet outer surfaces 139B and 139D in FIG. 18). The coatings 180 and 182 may optionally comprise a respective second section 180B and 182B with an outer shape that conforms more closely to the outer shape of the underlying portion(s), e.g., the first or second blade body outer surface (not shown; see blade body outer surface 131A, 131B in FIG. 18), of the substrate 128.

In FIGS. 20A, 21A, 22A, 23A, 24A, 25A, 26A, 27A, 28A, 29A, and 30A, the coatings 160, 164, 168, 172, 176, and 180 may be disposed on one or both of the first facets (i.e., the first and/or third facets 138A and 138C in FIG. 18) on the first outer side 148 of the substrate 128, and the portion 151 of the second outer side 150 that is free of any coating may comprise at least a portion of one or both of the second facets (i.e., the second and/or fourth facets 138B and 138D in FIG. 18). In FIGS. 20B, 21B, 22B, 23B, 24B, 25B, 26B, 27B, 28B, 29B, and 30B, the coatings 162, 166, 170, 174, 178, and 182 may be disposed on one or both of the second facets (i.e., the second and/or fourth facets 138B and 138D in FIG. 18) on the second outer side 150 of the substrate 128, and the portion 149 of the first outer side 148 that is free of any coating may comprise at least a portion of one or both of the first facets (i.e., the first and/or third facets 138A and 138C in FIG. 18). In the examples shown in FIGS. 20-30, the portion 149 or 151 of the outer side 148 or 150 that is substantially free of any coating may comprise substantially an entirety of the respective outer side 148 or 150. In the examples shown in FIGS. 31-33, the portion 151 that is substantially free of any coating may comprise only part of the second outer side 150 (also referred to herein as a first portion or an uncoated portion). A second portion 153 of the second outer side 150 may comprise a second coating 162 disposed substantially thereon, such that only part of the second outer side 150 is uncoated.

Figure 31:
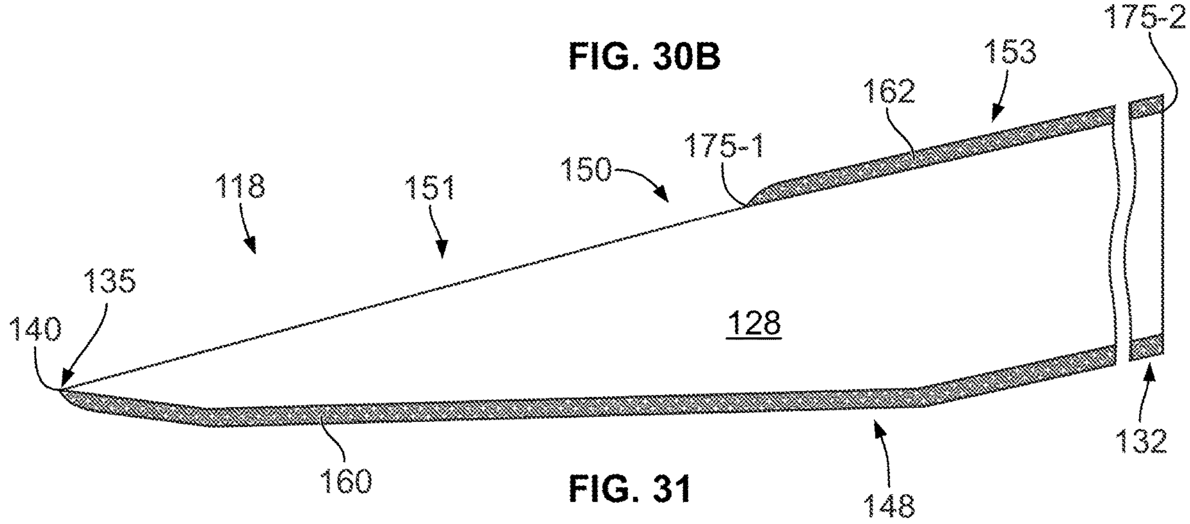
Figure 32:
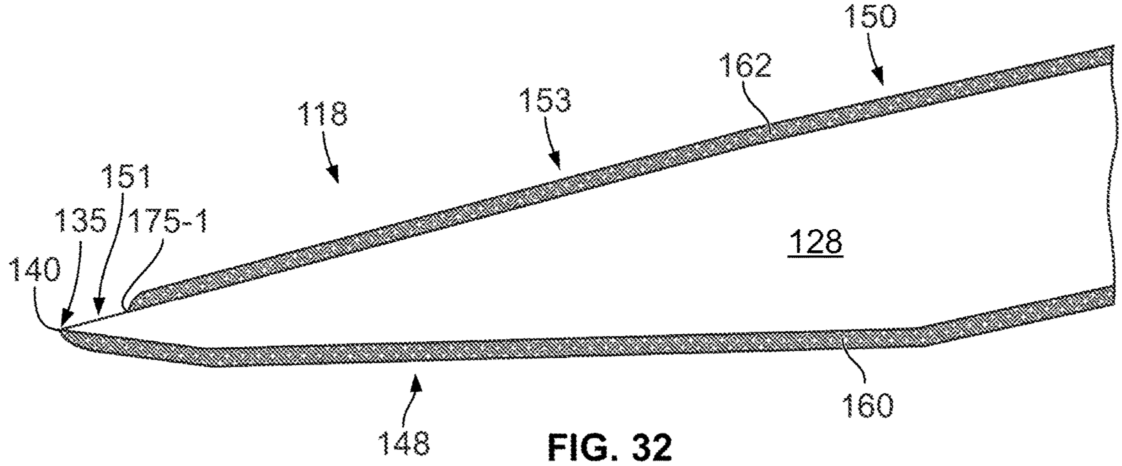
Figure 33:
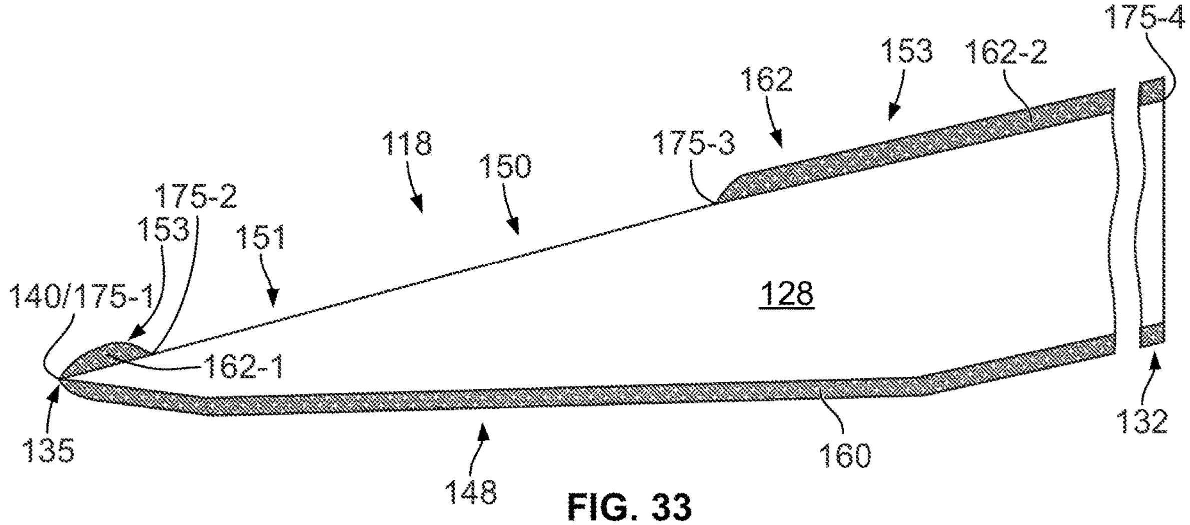

With reference to FIGS. 31 and 32 and the labeling of the substrate 128 in FIG. 18, the first portion 151 of the second outer side 150 that is substantially free of any coating may extend from the tip region 135 toward the base 132, and the second coating 162 may extend substantially from a first location 175-1 to a second location 175-2, in which the first location 175-1 is spaced apart from the tip region 135 and the second location 175-2 is located toward the base 132. In FIG. 31, the first location 175-1 may substantially correspond to the junction 139-3 between the blade body 130 and the fourth facet 138D, such that the uncoated portion 151 of the outer side 150 may comprise substantially an entirety of the second and fourth facets 138B and 138D. In FIG. 32, the first location 175-1 may substantially correspond to the junction 139-4 between the second and fourth facets 138B and 138D, such that the uncoated portion 151 of the outer side 150 may comprise substantially an entirety of the fourth facet 138D. It may be understood that the second coating 162 may be disposed so that the uncoated portion 151 of the outer side 150 is located at any desired location within these parameters.

With reference to FIG. 33 and the labeling of the substrate 128 in FIG. 18, in further examples, the second coating 162 may comprise first and second sections 162-1 and 162-2, and the uncoated portion 151 of the second outer side 150 may be located between the first and second sections 162-1 and 162-2 of the second coating 162, such that the uncoated portion 151 is spaced apart from the tip region 135 and the base 132. For example, the first section 162-1 of the second coating 162 may extend substantially from a first location 175-1 to a second location 175-2, and the second section 162-2 may extend substantially from a third location 175-3 to a fourth location 175-4. The first location 175-1 may substantially correspond to the tip region 135 of the substrate 128, and the second location 175-2 may be spaced apart from the third location 175-3. In the example shown in FIG. 33, the second location 175-2 may substantially correspond to the junction 139-4 between the second and fourth facets 138B and 138D; the third location 175-3 may substantially correspond to the junction 139-3 between the blade body 130 and the fourth facet 138D; and the fourth location 175-4 may be located toward the base 132 of the substrate 128, such that the uncoated portion 151 of the outer side 150 may comprise substantially an entirety of the second facet 138B. It is understood that the sections 162-1 and 162-2 of the second coating 162 may be disposed so that the uncoated portion 151 of the second outer side 150 is located at any desired location within these parameters. In addition, although the uncoated portion 151 is depicted in FIGS. 31-33 as being located on the second outer side 150, it is understood that the uncoated portion 151 could also be located on the first outer side 148 (not shown).

Figure 29A:
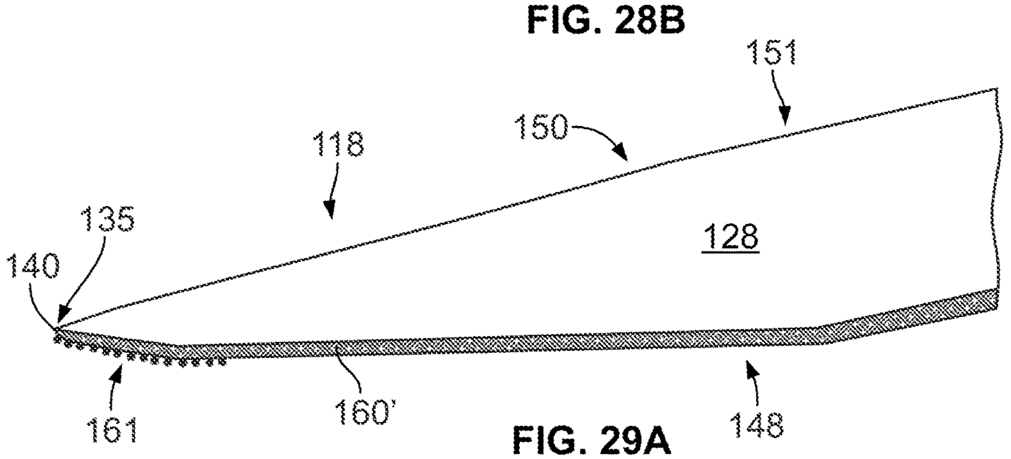
Figure 29B:
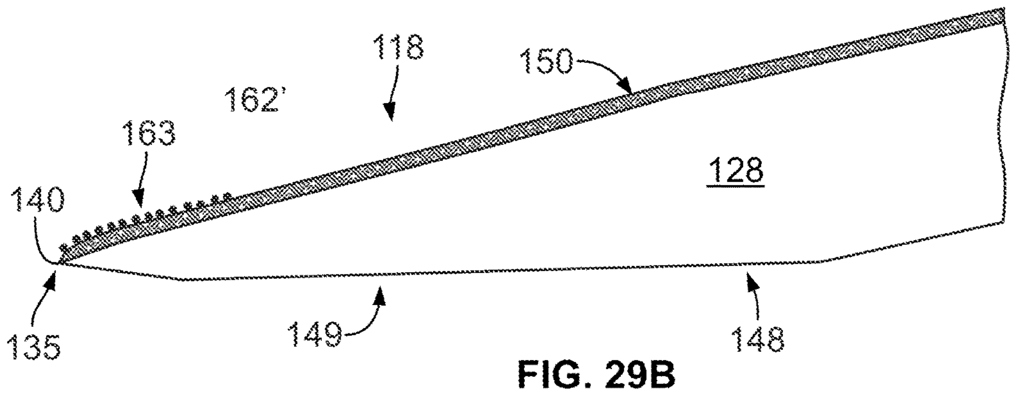

The coatings depicted in FIGS. 20-33 and/or layers and/or sections thereof may comprise one or more materials, as described herein in detail with respect to FIGS. 4-17. The material(s) may be selected for any of the properties and characteristics described herein (e.g., coefficient of friction, morphology, texture, hardness, etc.), and at least a section of the coatings and/or layers and/or sections thereof may be subjected to one or more post-application treatments, as described herein in detail. For example, one or more sections of the coatings and/or layers and/or sections thereof may be subjected to ion implantation, as shown in FIGS. 29A and 29B in which at least a section of a coating 160', 162' may comprise an ion-implanted material 161, 163.

FIGS. 34-37 are detailed views of a tip region 35 of a substrate 28, which may represent any of the substrates 28 and 128 in FIGS. 4-17 and 20-33. FIG. 34 depicts an idealized representation of a the tip region 35 in which a coating 60 is disposed only on the first outer side 48 of the substrate 28, i.e., on the left side of a split line S 28 of the substrate 28, and at least a portion 51 of the second outer side 50 of the substrate 28, i.e., on the right side of a split line $S_{28}$, is free of any coating.

Figure 35:
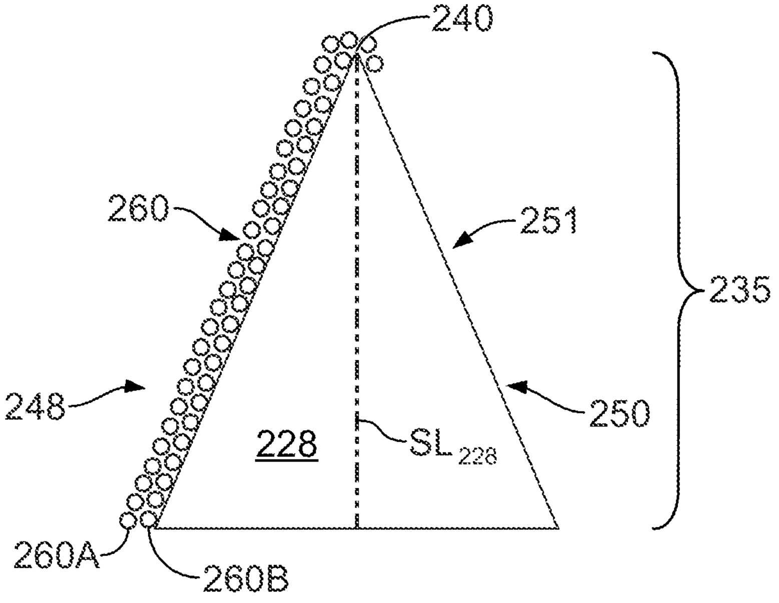
FIGS. 35, 36, and 37 are additional detailed side views similar to FIG. 34 of tip regions of razor blades comprising one or more coatings in accordance with the present disclosure.
Figure 36:
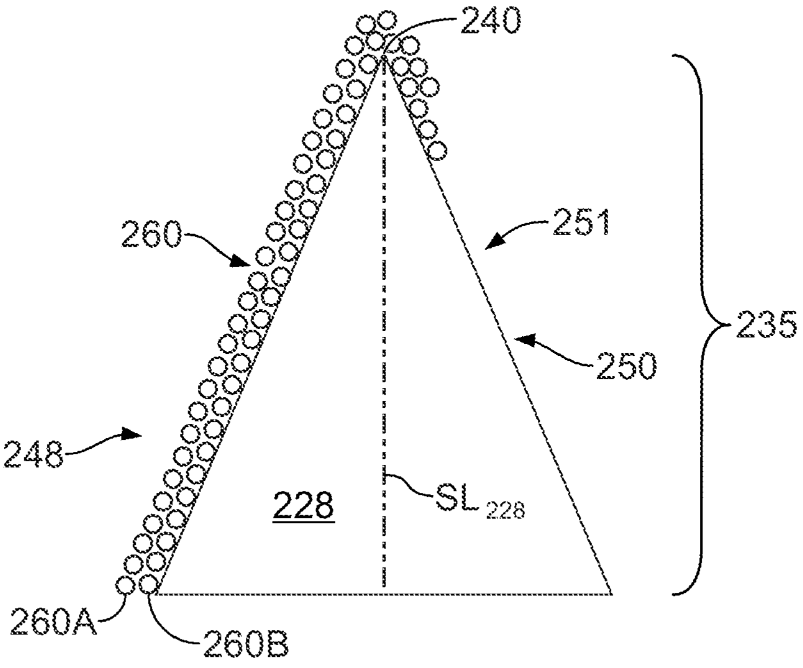
Figure 37:
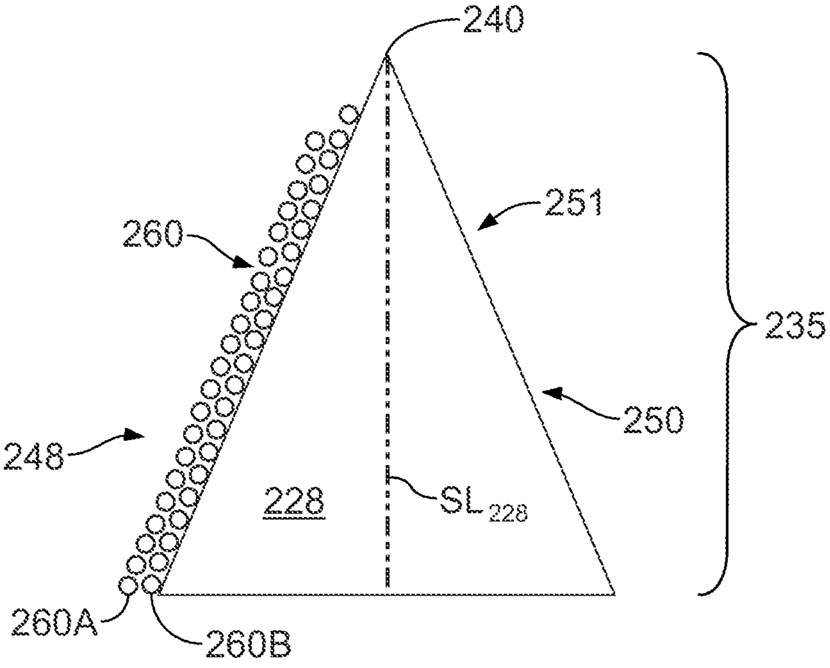

However, application of material(s) to a substrate 228 may produce a tip region 235 with slight imperfections, as illustrated in FIGS. 35-37. In FIGS. 35-37, a first outer side 248 of a substrate 228 (as defined by a split line SL 228) may comprise a coating 260 with a first layer 260A and a second layer 260B, and a portion 251 of a second outer side 250 may be substantially free of any coating. As shown in FIGS. 35 and 36, in some examples, a small portion of the coating 260 (may include one or both of the layers 260A and 260B) may be disposed on the second outer side 250 of the substrate 228 at the tip region 235, i.e., a small portion (extending less than or equal to about 1 μM back from the tip 240 toward the base) of the coating 260 may be located to the right of the split line $SL_{228}$. FIG. 37 provides a further example in which the coating 260 stops slightly short of the tip 240, such that there is a small gap (less than or equal to about 1 μM) between the coating 260 and the tip 240.

In the examples described herein, notwithstanding a small amount (extending less than or equal to about 1 μM back from the tip 240 toward the base) of overlap by the coating 260 onto the second outer side 250 or a gap (less than or equal to about 1 μM) between the coating 260 and the tip 240 in the tip region 235, the coating 260, including all layers 260A and 260B thereof, is considered to be disposed "substantially" on the first outer side 248 of the substrate 228 and to extend "from the tip region" when the majority of the coating 260 is disposed on the first outer side 248 of the substrate 228. In addition, the portion of the second side 250 extending "from the tip region toward the base" in FIGS. 35 and 36 is considered to be "substantially free of any coating," notwithstanding the small amount of overlap by the coating 260 onto the second outer side 250. Although the examples shown in FIGS. 34-37 depict the coating as being located on the first outer side 248 of the substrate 228, it is understood that the coating could also be located on the second outer side 250.

In examples in which the first and/or second coating comprise two or more layers (see FIGS. 5-8 and 21-24) and/or two or more sections (see FIGS. 9-11 and 25-27), each layer or section is described as extending from one point or location to another point or location on the substrate (e.g., a junction between adjacent ones of the facets or a junction between the blade body and one of the facets) and, in some examples, a section may adjoin and contact at least a portion of an adjacent section.

Similar to the structures depicted in FIGS. 35-37, the layers and/or sections may extend slightly beyond (less than or equal to about 1 μM), or stop slightly short of (less than or equal to about 1 μM), one or both of the identified locations. In some cases, there may be a small amount of mixing of materials at an interface between two adjacent sections or a small gap between the adjacent sections (less than or equal to about 1 μM). Notwithstanding these slight imperfections, a layer or section of a coating may be considered to extend "substantially" from one location to another location when the majority of the layer/section is disposed between the two identified locations.

Figure 38:
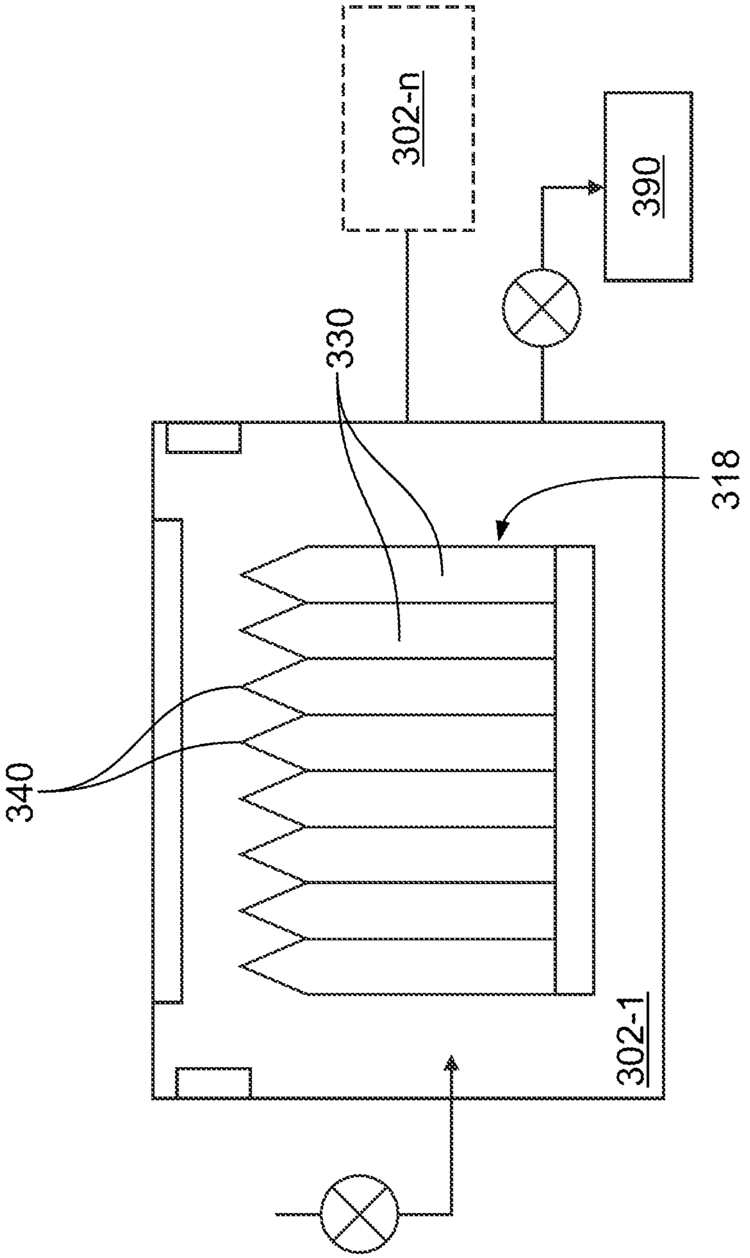
FIG. 38 is a schematic of a chamber showing razor blades capable of being coated via a deposition technique in accordance with the present disclosure.

The coatings described herein may be applied or selectively removed using one more techniques. FIG. 38 is a block diagram of a system 300 having one or more chambers and/or stations 302-1 to **302-*n* that may be used to apply one or more coatings to one or more portions of a plurality of razor blades 318 and/or to perform one or more post-application treatments following application of the one or more coatings. As shown, the razor blades 318 may be positioned within a first chamber 302-1 for application of one or more coatings using one or more techniques, such as vacuum deposition, spraying, dipping, brushing, molding, sintering, printing, etching, application via a pad or paint, ink-jet nozzle, or any combination thereof, any of which may or may not include masking one or more portions of the razor blades 318. In some examples, the chamber 302-1 may comprise a vacuum chamber with a vacuum pump 390. The system 300 may optionally comprise one or more additional chambers 302-*n*** for performing different coating techniques and/or to perform different post-application treatments.

The razor blades 318 may represent any razor blade described herein. The razor blades 318 may be arranged in any manner within the chamber 302-1. As shown, the razor blades 318 may be positioned adjacent to each other in an arrangement that may be referred to as a razor blade spindle. The blades 318 may also be disposed with a space in between each other (not shown) using spacers, which may allow coating coverage onto the blade bodies 330 of the razor blades 318 to be increased. The blades 318 may also be disposed with the edges (not labeled) and tips 340 facing in opposite directions or at different angles from each other (not shown). Any feasible orientation of the razor blades 318 is contemplated in the present disclosure.

The system 300 may be used to apply coatings to a razor blade, in which the razor blade comprises a substrate with first and second outer sides disposed opposite a split line. First and second coatings are applied to at least a portion of the first and second outer sides, with the first and second coatings extending from a tip region of the substrate toward a base and being disposed substantially on the respective first or second outer side. The coatings may each comprise one or more layers.

The system 300 may be configured to accommodate the application of multiple different kinds of materials, as described herein, including metals, fluorinated polymers, etc. The first and second coatings may be applied simultaneously or sequentially and may be applied using the same or different technique. In some examples, selective application of one or more materials may be accomplished by, for example, masking one or more portions of the substrate and applying the material(s) to the unmasked portion(s) of the substrate. The system 300 may also be configured to apply the first and second coatings to generate one or more desired properties for each coating, including a particular thickness, outer shape, morphology, texture, etc., as described herein. The system 300 may further be configured to perform one or more post-application treatments on at least one section of the first coating or the second coating, including ion implantation and/or altering a texture of the coating(s).

Figure 39:
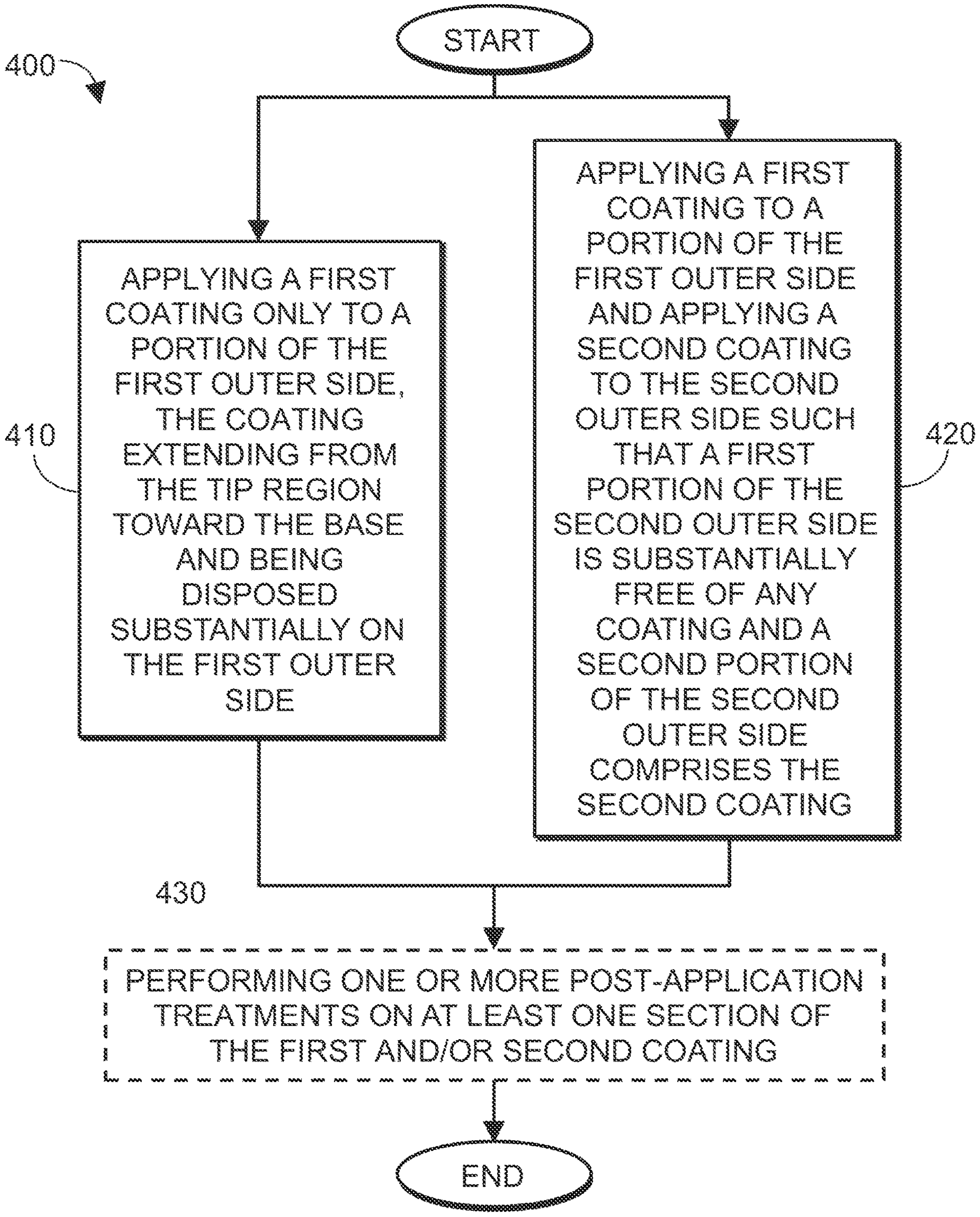
FIG. 39 is a flow diagram illustrating an exemplary method of coating a razor blade in accordance with the present disclosure.

FIG. 39 is a flow diagram illustrating an exemplary method 400 of coating a razor blade in accordance with the present disclosure. With reference to FIGS. 4 and 18, the razor blades 18, 118 may comprise a substrate 28, 128 having a tip portion 34, 134 comprising a tip region 35, 135, a blade body 30, 130 comprising a base 32, 132, and first and second outer sides 48, 148 and 50, 150 disposed opposite a split line $SL_{28}$, $SL_{128}$ of the substrate 28, 128, in which the first and second outer sides 48, 148 and 50, 150 converge at a tip 40, 140. The method 400 comprises either Step 410, which includes applying a first coating only to a portion of the first outer side, in which the coating extends from the tip region toward the base and is disposed substantially on the first outer side, or Step 420, which includes applying a first coating to a portion of the first outer side, in which the first coating extends from the tip region toward the base and is disposed substantially on the first outer side, and applying a second coating to the second outer side such that a first portion of the second outer side is substantially free of any coating and a second portion of the second outer side comprises the second coating, in which the first portion extends from the tip region toward the base or is spaced apart from the tip region and the base, after which the method 400 may conclude.

In some particular examples, the substrate may comprise the second coating. In some instances, the second coating may extend substantially from a first location to a second location, the first location being spaced apart from the tip region and the second location being located toward the base. In other instances, the second coating may comprise a first section extending substantially from a first location to a second location and a second section extending substantially from a third location to a fourth location, in which the first location may comprise the tip region, the second location may be spaced apart from the third location, and the first portion of the second outer side that is substantially free of any coating may be located between the first and second sections of the second coating. The first coating may comprise one or more first materials and the second coating may comprise one or more second materials, in which at least one of the second materials may be different from at least one of the first materials. The first and second coatings may be applied simultaneously or sequentially and/or using a same technique or different technique.

The first coating may be applied such that at least a section of the first coating defines an outer shape that is different from an outer shape of an underlying portion of the substrate or such that the first coating comprises a thickness that varies along at least a section of the first coating in a direction extending from the tip region toward the base of the razor blade.

In some examples, the Step 410 of applying the first coating may further comprise applying a plurality of layers of material. Applying the plurality of layers of material may comprise: applying a first layer to the portion of the first outer side, in which the first layer extends from the tip region toward the base for a first distance; and applying a second layer on top of at least a section of the first layer, in which the second layer extends from the tip region toward the base for a second distance that is the same as or less than the first distance. The first layer may comprise a first material and the second layer may comprise a second material that is different from the first material.

In other examples, the first outer side of the substrate may comprise one or more first facets and the second outer side may comprise one or more second facets. The first coating may be disposed on at least one of the first facets and the first portion of the second outer side that is substantially free of any coating may comprise at least a portion of one of at least one of the second facets. The first coating may be applied such that the first coating comprises: a first section extending substantially from a first location to a second location on the first outer side; and a second section extending substantially from the second location to a third location on the first outer side, in which the first location may comprise the tip region and the second location may comprise a junction between (i) two adjacent ones of the first facets, or (ii) the blade body and one of the first facets. The second location may comprise the junction between two adjacent ones of the first facets and the third location may comprise the junction between the blade body and one of the first facets, in which the first coating may be applied such that the first coating further comprises a third section extending substantially from the third location toward the base.

In further examples, the method may further comprise option Step 430, which includes performing one or more post-application treatments on at least one section of the first coating and/or when the substrate comprises the second coating, performing one or more post-application treatments on at least one section of the second coating. In some instances, the one or more post-application treatments may comprise one or more of: subjecting the at least one section of the first and/or second coating to ion implantation; or partially removing one or more sections of the first and/or second coating. In other instances, the one or more post-application treatments may further comprise selectively applying material to the first and/or second coating following partial removal of the one or more sections of the first and/or second coating. At least a portion of the first or the second outer side with the selective applied material may define a skin-contacting surface.

Representative embodiments of the present disclosure described above can be described as follows:

A. A razor blade comprising:

a substrate having a tip portion comprising a tip region, a blade body comprising a base, and first and second outer sides disposed opposite a split line of the substrate, wherein the first and second outer sides converge at a tip, wherein the first outer side comprises a first coating disposed substantially thereon, the first coating extending from the tip region toward the base, and wherein a first portion of the second outer side is substantially free of any coating, wherein the first portion extends from the tip region toward the base or is spaced apart from the tip region and the base.

B. The razor blade of paragraph A, wherein a second portion of the second outer side comprises a second coating disposed substantially thereon, the second coating extending substantially from a first location to a second location, wherein the first location is spaced apart from the tip region and the second location is located toward the base.

C. The razor blade of paragraph A or B, wherein the first portion comprises substantially an entirety of the second outer side.

D. The razor blade of any paragraphs A or C, wherein a second portion of the second outer side comprises a second coating disposed substantially thereon, the second coating comprising a first section extending substantially from a first location to a second location and a second section extending substantially from a third location to a fourth location, wherein the first location comprises the tip region, the second location is spaced apart from the third location, and the first portion of the second outer side that is substantially free of any coating is located between the first and second sections of the second coating.

E. The razor blade of any of paragraphs A to D, wherein at least a portion of the first outer side defines a skin-contacting surface.

F. The razor blade of any of paragraphs A to E, wherein the split line splits the substrate into two substantially equal halves.

G. The razor blade of any of paragraphs A to F, wherein the split line splits the substrate into two asymmetrical halves.

H. The razor blade of any of paragraphs A to G, wherein the first coating comprises a plurality of layers of material.

I. The razor blade of paragraph H, wherein the first coating comprises:

a first layer disposed substantially on the first outer side and extending from the tip region toward the base for a first distance; and a second layer disposed on top of at least a section of the first layer and extending from the tip region toward the base for a second distance that is the same as or less than the first distance.

J. The razor blade of paragraph I, wherein the first layer comprises a first material and the second layer comprises a second material that is different from the first material.

K. The razor blade of any of paragraphs A to J, wherein the first coating comprises a thickness that varies along at least a section of the first coating in a direction extending from the tip region toward the base of the razor blade.

L. The razor blade of any of paragraphs A to K, wherein the first coating comprises an ion-implanted material.

M. The razor blade of any of paragraphs A to L, wherein at least a section of the first coating defines an outer shape that is different from an outer shape of an underlying portion of the substrate.

N. The razor blade of of any of paragraphs A, C, or E to M, a second portion of the second outer side comprises a second coating disposed substantially thereon.

O. The razor blade of paragraph N, wherein the first coating comprises one or more first materials and the second coating comprises one or more second materials, at least one of the second materials being different from at least one of the first materials.

P. The razor blade of any of paragraphs A to O, wherein the first outer side comprises one or more first facets and the second outer side comprises one or more second facets.

Q. The razor blade of paragraph P, wherein the first coating is disposed on at least one of the first facets and the first portion of the second outer side that is substantially free of any coating comprises at least a portion of one of at least one of the second facets.

R. The razor blade of paragraph P, wherein the first coating comprises:

a first section extending substantially from a first location to a second location on the first outer side; and a second section extending substantially from the second location to a third location on the first outer side, wherein the first location comprises the tip region and the second location comprises a junction between (i) two adjacent ones of the first facets, or (ii) the blade body and one of the first facets.

S. The razor blade of paragraph R, wherein the second location comprises the junction between two adjacent ones of the first facets and the third location comprises the junction between the blade body and one of the first facets, the first coating further comprising a third section extending substantially from the third location toward the base.

T. A method of coating a razor blade comprising a substrate having a tip portion comprising a tip region, a blade body comprising a base, and first and second outer sides disposed opposite a split line of the substrate, wherein the first and second outer sides converge at a tip, the method comprising one of:

(i) applying a first coating only to a portion of the first outer side, the coating extending from the tip region toward the base and being disposed substantially on the first outer side; or (ii) applying a first coating to a portion of the first outer side, the first coating extending from the tip region toward the base and being disposed substantially on the first outer side, and applying a second coating to the second outer side such that a first portion of the second outer side is substantially free of any coating and a second portion of the second outer side comprises the second coating, wherein the first portion extends from the tip region toward the base or is spaced apart from the tip region and the base.

U. The method of paragraph T, wherein the substrate comprises the second coating.

V. The method of paragraph U, wherein the second coating extends substantially from a first location to a second location, the first location being spaced apart from the tip region and the second location being located toward the base.

W. The method of paragraph U, wherein the second coating comprises a first section extending substantially from a first location to a second location and a second section extending substantially from a third location to a fourth location, the first location comprising the tip region and the second location being spaced apart from the third location, wherein the first portion of the second outer side that is substantially free of any coating is located between the first and second sections of the second coating.

X. The method of any of paragraphs U to W, wherein the first coating comprises one or more first materials and the second coating comprises one or more second materials, at least one of the second materials being different from at least one of the first materials.

Y. The method of any of paragraphs U to X, wherein the first and second coatings are applied simultaneously.

Z. The method of any of paragraphs U to X, wherein the first and second coatings are applied sequentially.

AA. The method of any of paragraphs U to Z, wherein the first and second coatings are applied using a same technique.

BB. The method of any of paragraphs U to Z, wherein the first coating is applied with a first technique and the second coating is applied with a second technique that is different from the first technique.

CC. The method of any of paragraphs T to BB, wherein the first coating is applied such that at least a section of the first coating defines an outer shape that is different from an outer shape of an underlying portion of the substrate.

DD. The method of any of paragraphs T to CC, wherein the first coating is applied such that the first coating comprises a thickness that varies along at least a section of the first coating in a direction extending from the tip region toward the base of the razor blade.

EE. The method of any of paragraphs T to DD, wherein applying the first coating further comprises applying a plurality of layers of material.

FF. The method of paragraph EE, wherein applying the plurality of layers of material comprises:

applying a first layer to the portion of the first outer side, the first layer extending from the tip region toward the base for a first distance; and applying a second layer on top of at least a section of the first layer, the second layer extending from the tip region toward the base for a second distance that is the same as or less than the first distance.

GG. The method of paragraph FF, wherein the first layer comprises a first material and the second layer comprises a second material that is different from the first material.

HH. The method of any of paragraphs T to GG, wherein the first outer side of the substrate comprises one or more first facets and the second outer side comprises one or more second facets.

II. The method of paragraph HH, wherein the first coating is disposed on at least one of the first facets and the first portion of the second outer side that is substantially free of any coating comprises at least a portion of one of at least one of the second facets.

JJ. The method of paragraph HH, wherein the first coating is applied such that the first coating comprises:

a first section extending substantially from a first location to a second location on the first outer side; and a second section extending substantially from the second location to a third location on the first outer side, wherein the first location comprises the tip region and the second location comprises a junction between (i) two adjacent ones of the first facets, or (ii) the blade body and one of the first facets.

KK. The method of paragraph JJ, wherein the second location comprises the junction between two adjacent ones of the first facets and the third location comprises the junction between the blade body and one of the first facets, the first coating being applied such that the first coating further comprises:

a third section extending substantially from the third location toward the base.

LL. The method of any of paragraphs T to JJ, further comprising:

performing one or more post-application treatments on at least one section of the first coating.

MM. The method of paragraph MM, wherein the one or more post-application treatments comprise one or more of:

subjecting at least one section of the first coating to ion implantation; or partially removing one or more sections of the first coating.

NN. The method of paragraph MM, wherein the one or more post-application treatments further comprise selectively applying material to the first coating following partial removal of the one or more sections of the first coating.

OO. The method of paragraph NN, wherein at least a portion of the first outer side with the material defines a skin-contacting surface.

PP. The method of any of paragraphs TT to JJ, wherein the substrate comprises the second coating, the method further comprising:

performing one or more post-application treatments on at least one section of the second coating.

QQ. The method of paragraph PP, wherein the one or more post-application treatments comprise partially removing one or more sections of the second coating.

The illustrations presented herein are not intended to be actual views of any particular substrate, apparatus (e.g., device, system, etc.), or method, but are merely idealized and/or schematic representations that are employed to describe and illustrate various embodiments of the disclosure.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm.”

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A razor blade comprising:

a substrate having a tip portion comprising a tip region, a blade body comprising a base, and first and second outer sides disposed opposite a split line of said substrate, wherein said first and second outer sides converge at a tip, wherein said first outer side comprises a first coating disposed thereon, said first coating extending from said tip region toward said base and along the length of the substrate, wherein a first portion of said second outer side is free of any coating, wherein said first portion extends from said tip toward said base, a second portion of said second outer side comprises a second coating disposed thereon, said second coating extending from said first portion toward said base, wherein at least one of the first coating or the second coating comprises a polyolefin, and wherein the texture of the first coating is different than the texture of the second coating; wherein the texture of the first coating is substantially smooth and the texture of the second coating is more coarse than the texture of the first coating.

2. The razor blade of claim 1, wherein at least a portion of said first outer side defines a skin-contacting surface.

3. The razor blade of claim 1, wherein said split line splits said substrate into two equal halves.

4. The razor blade of claim 1, wherein said split line splits said substrate into two asymmetrical halves.

5. The razor blade of claim 1, wherein said first coating comprises an ion-implanted material.

6. The razor blade of claim 1, wherein at least a section of said first coating defines an outer shape that is different from an outer shape of an underlying portion of said substrate.

7. The razor blade of claim 1, wherein said first coating comprises one or more first materials and said second coating comprises one or more second materials, at least one of said second materials being different from at least one of said first materials.

8. The razor blade of claim 1, wherein said first outer side comprises one or more first facets and said second outer side comprises one or more second facets.

9. The razor blade of claim 8, wherein said first coating is disposed on at least one of said first facets and said first portion of said second outer side comprises at least a portion of one of at least one of said second facets.

10. The razor blade of claim 8, wherein said first coating comprises:

a first section extending from a first location to a second location on said first outer side; and a second section extending from said second location to a third location on said first outer side, wherein said first location comprises said tip region and said second location comprises a junction between (i) two adjacent ones of said first facets, or (ii) said blade body and one of said first facets.

11. The razor blade of claim 10, wherein said second location comprises said junction between two adjacent ones of said first facets and said third location comprises said junction between said blade body and one of said first facets, said first coating further comprising a third section extending from said third location toward said base.

12. The razor blade of claim 1, wherein said first coating comprises a thickness that varies along at least a section of said first coating in a direction extending from said tip toward said base of said razor blade.

* * * * *